(12) United States Patent
Walker et al.

(10) Patent No.: US 7,613,631 B2
(45) Date of Patent: Nov. 3, 2009

(54) METHOD AND APPARATUS FOR MANAGING SUBSCRIPTIONS

(75) Inventors: Jay S. Walker, Ridgefield, CT (US); Magdalena Mik, Greenwich, CT (US); James A. Jorasch, Stamford, CT (US); Andrew S. Van Luchene, Norwalk, CT (US); Michiko Kobayashi, Stamford, CT (US); Geoffrey M. Gelman, Stamford, CT (US); Russell Pratt Sammon, Stamford, CT (US); Andrew P. Golden, New York, NY (US); Adam Stevenson, Solana Beach, CA (US)

(73) Assignee: Walker Digital, LLC, Stamford, CT (US)

( * ) Notice: Subject to any disclaimer, the term of this patent is extended or adjusted under 35 U.S.C. 154(b) by 1 day.

(21) Appl. No.: 11/768,594

(22) Filed: Jun. 26, 2007

(65) Prior Publication Data

US 2007/0250388 A1    Oct. 25, 2007

Related U.S. Application Data

(60) Division of application No. 09/538,805, filed on Mar. 30, 2000, now Pat. No. 7,251,617, which is a continuation-in-part of application No. 09/221,457, filed on Dec. 28, 1998, now Pat. No. 6,415,262.

(60) Provisional application No. 60/165,366, filed on Nov. 12, 1999.

(51) Int. Cl.
*G06Q 20/00* (2006.01)

(52) U.S. Cl. .............................. 705/16; 705/14; 705/26; 235/378

(58) Field of Classification Search .................. None
See application file for complete search history.

(56) References Cited

U.S. PATENT DOCUMENTS 3,754,630 A    8/1973  Gilker ........................ 194/4
3,837,455 A    9/1974  Hurt ........................ 194/4 R (Continued)

FOREIGN PATENT DOCUMENTS

EP        0 025 754  A1    3/1981

(Continued)

OTHER PUBLICATIONS http://web.archive.org/web/19961221130906/www.columbiahouse.com*

(Continued)

*Primary Examiner*—F. Zeender
*Assistant Examiner*—Luna Champagne
(74) *Attorney, Agent, or Firm*—Walker Digital Management, LLC

(57) ABSTRACT

A subscription system allows a customer to establish a subscription to a product with one or more retailers (e.g., by establishing the subscription through a controller or central system). In one embodiment, a subscription is established by receiving a request to establish a subscription and receiving information that identifies a product. Terms of a subscription for the product are established. The established subscription is identified by a redemption identifier which is communicated to the customer. It is also determined whether the customer is complying with a frequency of the subscription.

5 Claims, 15 Drawing Sheets

U.S. PATENT DOCUMENTS

| | | | |
|---|---|---|---|
| 3,882,982 A | 5/1975 | Smith | 194/4 C |
| 3,938,638 A | 2/1976 | Moule | 194/4 C |
| 3,978,959 A | 9/1976 | Muellner | 194/4 R |
| 4,554,446 A | 11/1985 | Murphy et al. | 235/487 |
| 4,567,609 A | 1/1986 | Metcalf | 382/9 |
| 4,723,212 A | 2/1988 | Mindrum et al. | 364/401 |
| 4,799,156 A | 1/1989 | Shavit et al. | |
| 4,817,166 A | 3/1989 | Gonzalez et al. | 382/1 |
| 4,833,609 A | 5/1989 | Grulke, Jr. | 364/405 |
| 4,878,248 A | 10/1989 | Shyu et al. | 382/9 |
| 4,908,761 A | 3/1990 | Tai | 364/401 |
| 4,910,672 A | 3/1990 | Off et al. | 364/405 |
| 4,949,256 A | 8/1990 | Humble | 364/401 |
| 4,982,346 A | 1/1991 | Girouard et al. | 364/550 |
| 5,025,372 A | 6/1991 | Burton et al. | |
| 5,047,614 A | 9/1991 | Bianco | |
| 5,053,957 A | 10/1991 | Suzuki | |
| 5,056,019 A | 10/1991 | Schultz et al. | 364/405 |
| 5,081,685 A | 1/1992 | Jones, III et al. | 382/1 |
| 5,136,658 A | 8/1992 | Mori | 382/1 |
| 5,173,851 A | 12/1992 | Off et al. | 364/401 |
| 5,185,695 A | 2/1993 | Pruchnicki | 364/401 |
| 5,250,789 A | 10/1993 | Johnsen | |
| 5,256,863 A | 10/1993 | Ferguson et al. | 235/383 |
| 5,297,026 A | 3/1994 | Hoffman | 364/408 |
| 5,315,664 A | 5/1994 | Kumagai | 382/1 |
| 5,319,542 A | 6/1994 | King et al. | |
| 5,321,243 A | 6/1994 | Groves et al. | 235/449 |
| 5,327,508 A | 7/1994 | Deaton et al. | 382/7 |
| 5,331,544 A | 7/1994 | Lu et al. | 364/401 |
| 5,353,218 A | 10/1994 | De Lapa et al. | 364/401 |
| 5,380,991 A | 1/1995 | Valencia et al. | 235/383 |
| 5,388,165 A | 2/1995 | Deaton et al. | 382/7 |
| 5,426,281 A | 6/1995 | Abecassis | |
| 5,434,394 A | 7/1995 | Roach et al. | 235/375 |
| 5,448,471 A | 9/1995 | Deaton et al. | 364/401 |
| 5,459,306 A | 10/1995 | Stein et al. | |
| 5,481,094 A | 1/1996 | Suda | |
| 5,515,270 A | 5/1996 | Weinblatt | |
| 5,521,364 A | 5/1996 | Kimura et al. | |
| 5,537,314 A | 7/1996 | Kanter | |
| 5,568,406 A | 10/1996 | Gerber | |
| 5,612,868 A | 3/1997 | Off et al. | 364/214 |
| 5,621,812 A | 4/1997 | Deaton et al. | 382/100 |
| 5,636,346 A | 6/1997 | Saxe | 395/201 |
| 5,638,457 A | 6/1997 | Deaton et al. | 382/10 |
| 5,640,002 A | 6/1997 | Ruppert et al. | |
| 5,644,723 A | 7/1997 | Deaton et al. | 395/214 |
| 5,664,110 A | 9/1997 | Green et al. | |
| 5,664,115 A | 9/1997 | Fraser | |
| 5,675,662 A | 10/1997 | Deaton et al. | 382/137 |
| 5,684,965 A | 11/1997 | Pickering | 395/234 |
| 5,687,322 A | 11/1997 | Deaton et al. | 395/214 |
| 5,689,100 A | 11/1997 | Carrithers et al. | 235/380 |
| 5,710,557 A | 1/1998 | Schuette | 340/932.2 |
| 5,710,886 A | 1/1998 | Christensen et al. | 395/214 |
| 5,717,989 A | 2/1998 | Tozzoli et al. | 705/37 |
| 5,745,052 A | 4/1998 | Matsuyama et al. | 340/932.2 |
| 5,758,328 A | 5/1998 | Giovannoli | 705/26 |
| 5,758,329 A | 5/1998 | Wojcik et al. | |
| 5,761,647 A | 6/1998 | Boushy | |
| 5,774,868 A | 6/1998 | Cragun et al. | 705/10 |
| 5,774,870 A | 6/1998 | Storey | 705/14 |
| 5,781,632 A | 7/1998 | Odom | |
| 5,794,207 A | 8/1998 | Walker et al. | |
| 5,799,289 A | 8/1998 | Fukushima et al. | |
| 5,808,894 A | 9/1998 | Wiens et al. | |
| 5,822,735 A | 10/1998 | De Lapa et al. | 705/14 |
| 5,822,736 A | 10/1998 | Hartman et al. | 705/1 |
| 5,832,457 A * | 11/1998 | O'Brien et al. | 705/14 |
| 5,842,178 A | 11/1998 | Giovannoli | 705/26 |
| 5,848,399 A | 12/1998 | Burke | 705/27 |
| 5,857,175 A | 1/1999 | Day et al. | 705/14 |
| 5,870,716 A | 2/1999 | Sugiyama et al. | 705/26 |
| 5,873,069 A | 2/1999 | Reuhl et al. | |
| 5,880,449 A | 3/1999 | Teicher et al. | 235/383 |
| 5,895,454 A | 4/1999 | Harrington | |
| 5,898,594 A | 4/1999 | Leason et al. | |
| 5,905,973 A | 5/1999 | Yonezawa et al. | 705/27 |
| 5,905,975 A | 5/1999 | Ausubel | 705/37 |
| 5,915,244 A | 6/1999 | Jack et al. | 705/14 |
| 5,923,016 A | 7/1999 | Fredregill | 235/380 |
| 5,924,083 A | 7/1999 | Silverman et al. | 705/37 |
| 5,940,812 A | 8/1999 | Tengel et al. | 705/38 |
| 5,956,693 A | 9/1999 | Geerlings | 705/14 |
| 5,970,469 A | 10/1999 | Scroggie et al. | 705/14 |
| 5,970,470 A | 10/1999 | Walker et al. | 705/14 |
| 5,970,475 A | 10/1999 | Barnes et al. | |
| 5,974,396 A | 10/1999 | Anderson et al. | 705/10 |
| 5,999,914 A | 12/1999 | Blinn et al. | 705/26 |
| 6,012,039 A | 1/2000 | Hoffman et al. | 705/14 |
| 6,014,634 A | 1/2000 | Scroggie et al. | 705/14 |
| 6,017,157 A | 1/2000 | Garfinkle et al. | |
| 6,029,153 A | 2/2000 | Bauchner et al. | 705/42 |
| 6,055,513 A | 4/2000 | Katz et al. | 705/26 |
| 6,055,573 A * | 4/2000 | Gardenswartz et al. | 709/224 |
| 6,073,112 A | 6/2000 | Geerlings | 705/14 |
| 6,076,068 A | 6/2000 | DeLapa et al. | |
| 6,078,897 A | 6/2000 | Rubin et al. | 705/14 |
| 6,078,906 A | 6/2000 | Huberman | |
| 6,088,683 A | 7/2000 | Jalili | |
| 6,128,599 A | 10/2000 | Walker et al. | 705/14 |
| 6,131,087 A | 10/2000 | Luke et al. | |
| 6,233,564 B1 | 5/2001 | Schulze, Jr. | |
| 6,314,406 B1 | 11/2001 | O'Hagan et al. | |
| 6,321,984 B1 | 11/2001 | McCall et al. | |
| 6,332,128 B1 | 12/2001 | Nicholson | |
| 6,390,151 B1 | 5/2002 | Christman et al. | |
| 6,415,261 B1 | 7/2002 | Cybul et al. | |
| 6,415,262 B1 | 7/2002 | Walker et al. | |
| 6,460,020 B1 | 10/2002 | Pool et al. | |
| 6,553,346 B1 | 4/2003 | Walker et al. | |
| 7,280,978 B1 * | 10/2007 | Joao | 705/16 |
| 2002/0029171 A1 | 3/2002 | Senior | |

FOREIGN PATENT DOCUMENTS

| | | | |
|---|---|---|---|
| EP | 0 308 224 A2 | 3/1989 | 15/21 |
| EP | 0 512 413 A2 | 11/1992 | |
| EP | 0 512 509 A2 | 11/1992 | 5/0 |
| EP | 0 923 039 A1 | 6/1999 | 17/60 |
| EP | 0 933 717 A2 | 8/1999 | 17/60 |
| EP | 0 939 377 A2 | 9/1999 | 17/60 |
| EP | 0 964 587 | 12/1999 | |
| JP | 04-355985 A | 12/1992 | 15/21 |
| JP | 08-287201 A | 11/1996 | 17/60 |
| JP | 10214284 | 8/1998 | |
| WO | WO 92/14213 | 8/1992 | |
| WO | WO 96/29668 | 9/1996 | |
| WO | WO 97/16797 | 5/1997 | |
| WO | WO 97/23838 | 7/1997 | |
| WO | WO 98/03980 | 1/1998 | |
| WO | WO 98/21713 | 5/1998 | |
| WO | WO 98/28699 | 7/1998 | |
| WO | WO 98/34187 | 8/1998 | |
| WO | WO 98/57285 | 12/1998 | |
| WO | WO 99/11006 | 3/1999 | |
| WO | WO 99/19809 | 4/1999 | |
| WO | WO 99/41717 | 8/1999 | |
| WO | WO 00/11570 | 3/2000 | |

WO    WO 00/39723 A3    7/2000

OTHER PUBLICATIONS

Brochure: "Reaching Out In New Directions", First Data Corp. Merchant Services, undated, 18 pp.
Bagot, Brian, "Brand Report: Service Please", Aug. 1990, Marketing & Media Decisions, pp. 79-83, ISSN: 0195-4296.
Casper, Carol, "Restaurants seek loyal customers.", Information Access Company, a Thomson Corporation Company, Cowles Business Media Inc. Direct, May 1994, vol. 6, No. 5, p. 18, ISSN: 1046-4174, 3 pages.
Zimmerman, Denise, "Food Lion Launches Frequent Shopper Plan", Supermarket News, Jan. 30, 1995, vol. 45, No. 5, 2 pp.
"Brazilian companies sell by affinity card", Lafferty Publications Ltd., Insurance Industry International, Feb. 1995, No. 32, 1 page.
"Stop & Shop Debuts Mastercard", Information Access Company, a Thomson Corporation Company IAC (SM), Newsletter Database (TM) Lebhar-Friedman Inc., Oct. 23, 1995, No. 44, 1 page.
Marriott, Anne, "A credit deal— or not?; Co-branded cards' offer raise takers, debts", The Washington Times, Jul. 17, 1996, Section: Part B, Business, 3 pp.
Cross, Richard and Smith, Janet, "The Customer Value Chain", American Demographics, Inc., Marketing Tools, Jan./Feb. 1997, Section: Database/Direct, 5 pp.
Bradford, Stacey L., "Food Lion: King of the jungle?", Financial World, Jan. 21, 1997, Coden: FIWOAR, vol. 166, No. 1, p. 24, ISSN: 0015-2064, JRNL Code: Two, 2 pp.
Purpura, Linda, "Green Hills Farms finding gold in frequent-shopper cards.", Information Access Company, a Thomson Corporation Company, Capital Cities Media Inc., Supermarket News, Feb. 24, 1997, No. 8, vol. 47, p. 19, ISSN: 0039-5803, 2 pp.
Fickenscher, Lisa, "Merchant: American Express Seeks to Mine Its Data on Cardholder Spending Patterns", The American Banker, Mar. 24, 1997, Section: Credit/Debit/ATMS, 2 pp.
Gilligan, Gregory J., "Ukrop's Branches Into Finance; for the Chain's CEO, This Was A Deal That Was Too Good to Miss", The Richmond Times Dispatch, Apr. 27, 1997, Section: Business, 5 pp. E-1.
Bowie, Liz, "Food Lion looks toward Baltimore; Area a 'growth market' to chain; 20-25 stores may come, sources say; Company keeping quiet; No-frills retailer poses competition for region leader Giant", The Baltimore Sun, Apr. 28, 1997, Section: Business, 4 pp.
Stoneback, Diane, "It's In The Cards; Supermarkets Deal Savings To Their Best Shoppers", The Morning Call (Allentown), Jun. 18, 1997, Section: A.M. Magazine, 6 pp.
"A&P/Dominion Joins Air Miles (R) Reward Program", Canada NewsWire, Aug. 21, 1997, Financial News Section, 2 pp.
Purpura, Linda, "The great equalizer: when it comes to customer-loyalty programs, quick reactions to incoming data give independent retailers a competitive advantage.", Information Access Company, a Thomson Corporation Company, Capital Cities Media Inc., Supermarket News, Sep. 1, 1997, No. 35, vol. 47, p. 17, ISSN: 0039-5803, 3 pp.
Appel, Ted, "Smart Coupons Customers Save Big, Stores Track Spending With Discount Cards", The Press Democrat, Oct. 5, 1997, 3 pp.
Blackwell, Richard, "Get Club Z points for shopping CIBC", The Financial Post, Oct. 9, 1997, Section: Section 1, News, 1 page.
Bird, Anat, "Super Community Banking: Sharpen Strategy to Keep Your Bank's Most Profitable Customers for Long Haul", The American Banker, Dec. 3, 1997, Section: Community Banking, 2 pp.
"Here Come the Canadian Marketers", Faulker & Gray, a division of Thomson Information Services, Inc. a New York corporation, Jan. 1998, Section: Card Watch, 2 pp.
Smith, Rebecca, "Buy More, Pay Less; Frequent Shopper Programs Promise A Brave New World In Grocery Buying", Pittsburgh Post-Gazette, Jan. 19, 1998, Section: Business, 4 pp.
"CIBC Club Z* Visa Card", (http //www cibc com/products/visa/VisaClubZ htm), download date: Feb. 1, 1998, 2 pp.
"Club Z—Your Rewards On-Line", (http //www hbc com/clubz/default asp), download date, Feb. 1, 1998, 3 pp.

"Frequent Shopper Programs Are Used By 14% Of All Supermarkets", (http //www retailtech com/archive/frequent htm), download date: Feb. 1, 1998, 1 page.
"Turbocharging Your Customer-Loyalty Programs", (http //www retailtech com/archive/turbocha.htm), download date: Feb. 1, 1998, 2 pp.
U.S. Appl. No. 09/049,297, entitled "System and Method for Tracking and Establishing a Progressive Discount Based Upon a Customer's Visits to a Retail Establishment", filed Mar. 27, 1998.
Amato-McCoy, Deena, "Co-Branded Acme Credit Card Rewards Loyal Users", Information Access Company, a Thomson Corporation Company IAC (SM) PROMT (R), Capital Cities Media Inc., Supermarket News, Jun. 15, 1998, p. 17, ISSN: 0039-5803, 2 pp.
"A CME Markets, U.S. Bancorp Debut Visa Rewards Card", Phillips Business Information, Inc., Card News, Jun. 22, 1998, vol. 13, No. 12, 2 pp.
Website, "American Express Home Page", (http //www americanexpress com/), download date: Dec. 30, 1998, 9 pp.
U.S. Appl. No. 09/223,903, entitled "System and Method for Negative Retroactive Discounts", filed Dec. 31, 1998.
PCT International Search Report for Application No. PCT/US99/27709, dated Oct. 18, 2000, 7 pp.
Coyte, Peter et al., "Subscribe, Cancel, or Renew: the Econometrics of Reading by Subscription." Canadian Journal of Economics, vol. 241, pp. 101-123 Feb. 1991, 1 page.
Leibson, Beth, "Buying Contracts Deliver the Goods, and Hefty Discounts Too." Facilities Design & Management V10, N4 pp. 54-57 Apr. 1991, ISSN: 0279-4438, 5 pp.
Tinnelly, Bettann, "The Custom Switch isn't a Rare Choice Anymore—Benefits Outweigh Added Costs, Makers say." Electronic Buyers' News Mar. 28, 1994, 4 pp.
"Consumers: planet U" www.planetu.com download Nov. 23, 1998, 9 pp.
"planet U: Internet Promotions for Consumer Package Goods." http://planetu.com download Aug. 30, 1999, 10 pp.
Lenahan, Jim, "Music by Mail: To get the best deals, you have to get the rhythm: Join, fulfill, quit, repeat." The Courier-Journal Apr. 12, 1999, 5 pp.
Barlow, Richard G. "Exit Lines: Closing a Loyalty Program Gracefully in Five Acts." http://www.colloquy.com download date Oct. 23, 1999, 5 pp.
"Our Risk-Free introductory offer doesn't require long-term commitments." http://www.bmgmusicservice.com download date Oct. 23, 1999, 1 page.
"Columbia House: What's the Deal?" http://www.columbiahouse.com download date Oct. 23, 1999, 1 page.
"More.com" http://www.more.com download date Nov. 9, 1999, 14 pp.
U.S. Appl. No. 09/221,457, "Method and Apparatus for Determining a Subscription to a Product in a Retail Environment" Filed Dec. 28, 1998.
The Kansas Consumer lease-purchase agreement act, effective since 1991, 6 pp.
Columbiahouse.com, dated Dec. 21, 1996, 9 pp.
Bestbuy.com, dated Dec. 26, 1996, 4 pp.
Sebastian, Pamela, Wall Street Journal, "A Special Background Report on Trends in Industry and Finance", dated Apr. 6, 1995, 3 pp.
"IXC and Cisco Announce Technology and Marketing Alliance", Business Wire, Feb. 16, 1999, 2 pp.
Office Action for U.S. Appl. No. 09/538,805 mailed Dec. 20, 2002, 8 pp.
Office Action for U.S. Appl. No. 09/538,805 mailed Aug. 28, 2003, 5 pp.
Office Action for U.S. Appl. No. 09/538,805 mailed Sep. 9, 2004, 7 pp.
Office Action for U.S. Appl. No. 09/538,805 mailed Dec. 23, 2003, 5 pp.
Office Action for U.S. Appl. No. 09/538,805 mailed Feb. 25, 2005, 6 pp.
Office Action for U.S. Appl. No. 09/538,805 mailed Jun. 22, 2006, 21 pp.
Notice of Allowance and Fee Due mailed Mar. 27, 2007, 7 pp.

Office Action for U.S. Appl. No. 09/221,457 mailed Nov. 9, 2000, 20 pp.
Notice of Allowance for U.S. Appl. No. 09/221,457, 6 pp.
Notice of Allowance and Fees Due, mailed Nov. 29, 2001, 14 pp.
Notice of Allowability for U.S. Appl. No. 08/889,589, mailed Mar. 26, 1999, 7 pp.
Office Action for U.S. Appl. No. 09/340,953 mailed Mar. 24, 2001, 24 pp.
Office Action for U.S. Appl. No. 09/340,953 mailed Nov. 5, 2001, 26 pp.
Office Action for U.S. Appl. No. 09/340,953 mailed Jul. 18, 2002, 16 pp.
Office Action for U.S. Appl. No. 09/340,953 mailed Aug. 27, 2004, 28 pp.
Office Action for U.S. Appl. No. 09/340,953 mailed Feb. 28, 2005, 40 pp.
Office Action for U.S. Appl. No. 09/340,953 mailed Apr. 18, 2006, 28 pp.
www.cyrobank.com, dated Feb. 8, 1997, 8 pp.
Williams, Dana, CA-MANMAN/X Purchase Contracts; Computer Associates International Inc. 1 page.
ICB Toll Free.com News and Consulting "Welcome to ICB Toll Free News", 2 pp.
"Subscription Agreement for ICB Toll Free News" Online Edition download date Feb. 7, 2001, 3 pp.
Http//icbtollfree.com/login.cfm?nextURL copyright, 1995-200, download date Feb. 8, 2001, 3 pp.
ICB Toll Free . Com News and Consulting, "Save your login Information" download date Feb. 8, 2000, 3 pp.
Charles Mount, Suits say airlines overcharge for cancellations, Chicago Tribune, Dec. 31, 1985,1 pp.
Mark Wettler, Special delivery: evaluating Document Delivery Services, download date Feb. 7, 2001.
Farnswoth, E. Allan, Your Loss or My Gain? The Dilemma of the Disorgement Principle in Breach of Contract, May 1985, Yale Law Journal, 55 pp.
Steve Caulk, Airline industry surrenders to heavy corporate discounts, Rocky Mountain News, May 15, 1993,, 2 pp.
Smith, Lionel, Disgorgement of the profits of breach of contract: Property, Contract and "efficient Breach", The Canadian Business Law Journal, Sep. 1994, 1 page.
"Cellular Wrong Signals", Newsday, Jul. 2, 1993, 1 pp.
Love, Barbara, "Folio: Plus" The Magazine for Magazine Management, Nov. 15, 1995, 5 pp.
Samuelson, Richard, "Accounting for Liabilities to Perform Services", Accounting Horizons, Sep. 1993, 15 pp.
"Purchase Connection Announces New Committed Volume Buying Program" PR Newswire, Feb. 18, 1998, 1 page.
Glaser, Martha, "Buying Groups: What Have You Done For Me Lately?" Drug Topics, vol. 36, No. 11, Jun. 8, 1992, 5 pp.
McNichol, Bethanye, "Fresh Way To Spend Money", Oregonian, Mar. 2, 1991, 2 pp.
"Marsh Using Coupons To Build Videos" Supermarket News, Jan. 30, 1989, 1 page.
Bauman, Risa, People Builds Newstand Buyers Database, Direct, vol. 3, No. 2, Feb. 1991, 1 page.
Baril, Charles P. et al., "Managing Risk With Derivatives", Management Accounting, Nov. 1996, 11 pp.
King, Elliot, "PCs for Sale By Mail" Target Marketing, vol. 15, No. 6, Jun. 1999, 5 pp.
Ca-MANMAN/X:Purchase Contracts http://business.software-directory/software-2. download date Oct. 27, 1999, 2 pp.
Gill, Penny, "Added Value: Relationship Marketing Is One Way for Retailers to Build Loyalty", Stores, Oct. 1991, vol. 73, No. 10, pp. 39-40, ISSN: 0039-1867, 4 pp.
Pogoda, Dianne M., "G.E.C.C. offers credit card with discounts, rebates; General Electric Capital Corp.", WWD (Women's Wear Daily), Sep. 3, 1992, 2 pp.
Svaldi, Aldo, "Niemberger tries to bring banking to masses", Denver Business Journal, Mar. 29, 1996, 2 pp.
Weissman, Ira, "Bankers' acceptance financing—the link to financing global market activity", CPA Journal, Aug. 1996, 4 pp.
Selasky, Susan, "Easy-to-swallow savings; Diner credit cards serve wide menu of discounts", Pittsburgh Post-Gazette, Dec. 5, 1996, 3 pp.
Fram, Eugene H., "The customer penalty box", Marketing Management, Fall 1997, 6 pp.
Wald, Matthew L., "Spending It; Untying cellular from those annual contracts.", The New York Times, Mar. 15, 1998, 2 pp.
Cruz, Humberto "The Savings Game", The Cincinnati Enquirer, Aug. 31, 1998, Section: Financial, 3 pp.
Elkin, Tobi, "Promotions: MasterCard Wins Coveted On-Pack Real Estate in Tie-in with Mircrosoft", Brandweek, formerly Adweek Marketing Week, Sep. 14, 1998, 1 pp.
"Asbury Park Press, N.J., Trouble Shooter Column", Asbury Park Press, Dec. 3, 1998, 2 pp.
Watson, Stu "What's the deal with "free" trips?", Travelers' News-Stand, (http //www thetrip com/completetraveler/article/0,1355,1-1-9_1238,00 html), Dec. 14, 1998, 5 pp.
"Northwest Airlines, Sprint to enter into mileage partnership; consumers can earn up to 16,500 frequent flyer miles . . . "PR Newswire, Jan. 5, 1999, 2 pp.
"About Savesmart", (http://www.savesmart.com/about/savesmart.html), Download date: Jan. 12, 1999. 2 pp.
"AltaVista™ Signup—AltaVista's special offer to you . . . ", Copyright 1995-1998, 1 pg.
"The Biggest Blockbuster of all time is yours from sprint", (http://csg.sprint.com/titanic), Download date: Jan. 18, 1999, 1 pg.
WWW.PRIZEPOINT.COM is Live On the Internet!; New 'Reward Entertainment' Meets Needs of Growing Mass-Market Audience Online, BusinessWire, Feb. 1, 1999, 4 pp.
"In Online Auction First, Auction Universe Offers a 10% Rebate on Purchases", Business Wire, Apr. 6, 1999, 3 pp.
Vickers, Amy, "Clicks mean points in loyalty game; The success of offline loyalty schemes has been the model for offline imitations, but consumers need greater flexibility", New Media Age, Apr. 29, 1999, 6 pp.
Website: "Deja.com: [email] Free $100 Aircheck plus $15,000 in Travel", (http:///x24 deja . . . ), download date: May 24, 1999, 6 pp.
Corey, Matt, "Clip 'n' pay; proposed increase in coupon processing fees raises production cost issues", Food & Beverage Marketing, Jun. 1, 1999, Section: No. 6, vol. 18, 4 pp.
Armstrong, Larry, "The Free-PC Game: Lure 'Em in and Lock 'Em Up", Business Week, Jul. 19, 1999, 1 pg.
"Tiny Free PCs—Watching the "free" PC trend . . . ", (http://www.digital.com/rcfoc/19990802.htm), Download date: Aug. 3, 1999, 2 pp.
Poletti, Therese "Latest Twist on Free PCs—Free iMacs" Yahoo! News, (http // dailynews yahoo com/headlines/tc/story html?s=v/nm/19990803/tc/tech_freemacs_1.html), Download date: Aug. 9, 1999, 2 pp.
Petersen, Scot, "New breed of auctioneer moving into mainstream; online auctions; Industry Trend or Event", PC Week, Nov. 8, 1999,2 pp.
"Creating reward programs that really encourage loyalty; Loyalty schemes need to be simple, encourage redeeming and recognize long-standing customers says David Rankin", Brand Strategy, Jan. 21, 2000, 5 pp.
"American Airlines—American Eagle", download date: Feb. 10, 2000.
"Sportsline, Olds team up for online sales drive", AdWeek; Eastern Edition, Mar. 13, 2000; 2 pp.
Carroll, John "Time-Sharing Prize Promises", (http://emantel.orconet.com/cc/timeshare.html), Download date: May 16, 2000, 6 pp.
"The Problem with Time Shares", http://www.frommers.com/soap_box/testy_opinions/phil_15.html), Download date: May 16, 2000, 3 pp.
Website: "Surfbuzz.com Welcome!", (http www surfbuzz com/main jhtml), download date: Jun. 8, 2000, 4 pp.
"Oldsmobile Feeling "Tournament Fever" with new CBS Sportsline, MVP.COM partnership", (http://wwwgoogle.co . . . ) Download date: Sep. 21, 2000, 2 pp.

Website: "BestBuy.com Delivery and In-Store Pickup", (http://www.bestbuy.com/InfoCenter/Delivery/index.asp?m=937), download date: Oct. 25, 2002, 6 pp.

"Shell Unveils New Fueling Technologies; Systems Will Radically Alter Gas Station Experience", PR Newswire, Financial News Section, Apr. 9, 1997, 3 pp.

Abcede, Angel "Pump technology expands potential for sales, convenience; oil companies; Cover Story", National Petroleum News, Aug. 1997, 9 pp.

Purchase Connection Announces New Committed Volume Buying Program, PR Newswire, Feb. 18, 1999, 2 pp.

Snow, Matthew, "Mobil Uses IT to speed past competition; Technology Information", Datamation, Oct. 1997, 1 pg.

Mobil and MCI to Test New Multi-Retailer Prepaid Gasoline—Telephone Card, Business Wire, Oct. 6, 1997, 2 pp.

Leading Gasoline Dispenser manufacturer, Gilbarco Inc. Integrates Siris Radio Frequency Technology and Will Install at Mobil Stations Soon, Business Wire, Feb. 10, 1998, 2 pp.

Abcede, Angel, "Electronic Benefits transfer keys into store payment mix", National Petroleum News, No. 5 May 199, 4 pp.

Barnack, Renee "Prepaid phenomena: prepaid phone cards pave the way for additional prepaid offerings" National Petroleum News, May 1998, 4 pp.

Wright, Darren Prepaid gas cards: are they a hindrance? National Petroleum News, Jan. 1999, 4 pp.

Donegan, Priscilla, "Siphoning off sales: having lost share in many categories to retail channels; supermarkets are looking to turn the tables as they go after the gasoline market", Grocery Headquarters, May 1, 1999, 8 pp.

Vavra, Bob "Stealth marketing; how convenience stores can benefit from high-volume retail technology", National Petroleum News, Jun. 1, 1999, 3 pp.

Mobil Pioneers E-Commerce to Personalize Customer Service, The Oil and Gas Journal, Jul. 5, 1999, 3 pp.

Gilbarco Installs Web-Enabling Technology Into Gasoline Dispensers; e-Crind Capability Will Be Available As Feature On Next Generation of Gilbarco Dispensers, PR Newswire, Oct. 7, 1999, 2 pp.

New Company's Revolutionary Gas Pump Featured at COMDEX; Turn on the Pump, Click on the Internet, PR Newswire, Nov. 17, 1999, 2 pp.

Eckelbecker, Lisa, "Lucky Customer locked in oil price", Telegram & Gazette, Jan. 26, 2000, 3 pp.

Naik, Gautam, "In Digital Dorm, Click on Return for Soda", The Wall Street Journal Online, undated, 3 pp.

"FAQ: CSH Coke Machine Information", FAQ, May 23, 1994, vol. 1.2, (http //www cs uu nl/wais/html/na-dir/csh-coke-machine-info html), 6 pp.

Website: "Groceries Online", (http //www groceries-online com/), Copyright 1996 Groceries Online, Inc, 4 pp.

Website: "Computer Science House: Projects: Drink Machine", (http //www csh rit edu/proj/drink html), download date: Jan. 29, 1998, 2 pp.

Fallon, James, "Safeway Puts Ordering into Customers' Palms", Executive Technology, Jan. 1999, 1 pg.

Website: "SaveSmart—How SaveSmart Works for Consumers", (http //www savesmart com/consumer/consumer_howitworks html), download date: Jan. 17, 1999, 7 pp.

Website: "welcome to planet U, providers of U-pons—Internet Coupons", (http //www planetu com/), download date: Mar. 16, 1999, 7 pp.

Lazarus, David, "E-Commerce, Japanese Style", Wired Online, (http // www wired com), Jun. 7, 1999, 3 pp.

"Wal-Mart vs. Amazon: The fight begins", Yahoo News, (http //www yahoo com), Jun. 9, 1999, 3 pp.

"Circuit City to Integrate E-Commerce With Store Shopping: Retailer's E-Superstore—www Circuitcity com—to Open in July", PR Newswire, Jun. 15, 1999, 3 pp.

Frederick, James, "Walgreens gears for opening of its own Internet pharmacy", Drug Store News, Jul. 19, 1999, 2 pp.

"Internet Wine Gift Company Offers Answer to Recent Legislation", Source: Send.com, Aug. 10, 1999, 2 pp.

Examiner's Affidavit, James W. Myhre, Feb. 22, 2001, 1 pg.

The Book-of-the-Month Club, Inc. History, 7 pp.

The Literary Guild document How to Join, 2 pp. Date : 2008.

Literary Guild membership agreement document, 2 pp.

Harris, Russell, "Standing Up to Charge Backs", Apparel Industry Magazine, Jan. 1996, 2 pp.

Yenckel, James T. "The impact on air fares; The bargains began", The Washington Post, Feb. 10, 1991, 5 pp.

Card Trak, "Gee What a Month", CardTrak Online, Sep. 1992. 3 pp.

"Independent Petroleum Association of America, et al. *Appellants* v. *Bruce Babbitt, et al.* Appellees", United States Court of Appeals for the District Court of Columbia Circuit, Argued Apr. 16, 1996, Decided Aug. 27, 1997, No. 95-5210, Consolidated with No. 95-5245, 19 pp.

Shanklin, Mary, "How to Avoid Buyer Blues; Expert Advice on What Not to Do if You're in the Market for a House", The Orlando Sentinel, Jun. 23, 1996, 5 pp.

Robin, Michael, "Staking a Claim in the Digital Frontier", Micro Times, (http // www microtimes com/165/digitalfrontier html), Copyright 1997. 12 pp.

"US Patent for Buyer-driven E-Commerce System is Issued to Priceline.com", Web Vantage Technology Guide for the Emerging Internet, (http www web-vantage com/wv/980811n3 cfm), Aug. 11, 1998. 2 pp.

Website: "Atmel Corporation—Terms and Conditions of Purchase and Sale", (http //www atmel com/atmel/copyright html), download date: Mar. 22, 1999, 9 pp.

Website: "Auction Terms & Conditions—Collectit.net", (http www collectit net/info/auctiontc html), download date: Mar. 22, 1999, 2 pp.

Buchanan, Leigh, "A Business Model of One's Own", Inc. Magazine, Nov. 1998, p. 82, (http www inc com/inc magazine/archives/11980821 htm), 7 pp.

Website: "What is priceline.com? Where you name the price!", (http www priceline com/PriceLineASPHomePage/html/company htm), download date: Mar. 22, 1999, 2 pp.

Definition of "Subscription", Merriam-Webster Collegiate Dictionary, (http www search eb com/dictionary), May 8, 2003, 1 pg.

Supplemental Notice of Allowability for U.S. Appl. No. 09/538,805 mailed Jun. 18, 2007, 2 pp.

Office Action for U.S. Appl. No. 10/124,809 mailed Jun. 15, 2009, 15 pp.

Office Action for U.S. Appl. No. 10/124,809 mailed Oct. 30, 2008, 11 pp.

Office Action for U.S. Appl. No. 10/124,809 mailed Feb. 11, 2008, 9 pp.

Office Action for U.S. Appl. No. 10/124,809 mailed Aug. 20, 2007, 9 pp.

Office Action for U.S. Appl. No. 11/930,871 mailed Jan. 23, 2009, 12 pp.

Office Action for U.S. Appl. No. 11/930,871 mailed Jun. 11, 2008, 10 pp.

Office Action for U.S. Appl. No. 11/930,945 mailed Oct. 24, 2008, 18 pp.

Office Action for U.S. Appl. No. 11/930,945 mailed Apr. 10, 2008, 12 pp.

Office Action for U.S. Appl. No. 11/931,018 mailed Oct. 24, 2008, 15 pp.

Office Action for U.S. Appl. No. 11/931,018 mailed Apr. 10, 2008, 14 pp.

Office Action for U.S. Appl. No. 09/540,709 mailed Sep. 28, 2004, 21 pp.

Office Action for U.S. Appl. No. 09/540,709 mailed Feb. 17, 2004, 19 pp.

Office Action for U.S. Appl. No. 09/540,709 mailed May 12, 2003, 8 pp.

Decision on Appeal for U.S. Appl. No. 10/642,894 mailed Feb. 15, 2008, 26 pp.

Reply Brief U.S. Appl. No. 10/642,894, filed Dec. 18, 2006, 24 pp.

Examiner's Answer for U.S. Appl. No. 10/642,894 mailed Oct. 18, 2006, 15 pp.

Appeal Brief for U.S. Appl. No. 10/642,894, filed Jul. 24, 1996, 85 pp.

Office Action for U.S. Appl. No. 10/642,894 mailed Jul. 19, 2006. 7 pp.

Office Action for U.S. Appl. No. 10/642,894 mailed Jan. 10, 2006. 6 pp.

Office Action for U.S. Appl. No. 10/642,894 mailed Jun. 22, 2004. 9 pp.

Decision on Appeal for U.S. Appl. No. 09/340,953 mailed Jul. 31, 2009, 21 pp.

* cited by examiner

300

| PRODUCT IDENTIFIER 302 | PRODUCT DESCRIPTION 304 | RETAIL PRICE 306 |
|---|---|---|
| P1111 | 4 PACK OF SOFT-BRAND TOILET PAPER | $2.04 |
| P2222 | 1/2 GALLON OF MILK | $1.23 |
| P3333 | STANDARD OIL CHANGE | $25.00 |
| P4444 | 1 BAG OF TORTILLA AND 1 JAR OF SALSA | $5.34 |
| P5555 | ANY ITEM FROM THE BAKERY DEPT. | - |
| P6666 | ANY ICE CREAM PRODUCT | - |

FIG. 3

| CUSTOMER IDENTIFIER 402 | CUSTOMER DATA 404 | PAYMENT IDENTIFIER 406 | CONTACT INFORMATION 408 | ACTIVE SUBSCRIPTION IDENTIFIER 410 | SUBSIDY(S) 412 |
|---|---|---|---|---|---|
| 1234-5678-9012-3456 | ADAM SMITH | 1234-5678-9012-3456 | 314 PI LANE, ANYWHERE, CA, 90009 | S12345, S23456 | SUB345 |
| 234-678-9011 | BETHANY JONES | 2718-2818-2845-9045 | (234)678-9011 | S11111 | SUB123 |
| 123-45-6789 | CHRISTOPHER ROBIN | 1111-2222-3333-4444 | EEYORE@POOH.NET | S22222 | - |

| RETAILER 502 | AVAILABLE SUBSCRIPTION IDENTIFIER 504 | PRODUCT IDENTIFIER 506 | SUBSCRIPTION PRICE 508 | FREQUENCY 510 | DURATION 512 | PENALTY 514 | MODIFICATION 516 | DEPOSIT AMOUNT 518 |
|---|---|---|---|---|---|---|---|---|
| JOE'S STORE | SR1111 | P1111 | >= $0.99 | WEEKLY; MONTHLY | >= 6 MONTHS <= 2 YEARS | X1, X5 | YES | --- |
| JOE'S STORE | SR1112 | P5555 | >= 80% OF RETAIL PRICE | BIWEEKLY; BIMONTHLY | >=1 MONTH | X2, X3 | YES | --- |
| JOE'S STORE | SR1113 | P4444 | $5.00 | MONTHLY; BIMONTHLY | 1 YEAR | X1, X3 | PENDING RETAILER APPROVAL | $10.00 |
| SAM'S STORE | AP1111 | P1111 | >= $1.50 | WEEKLY; MONTHLY; EVERY 3 MONTHS | >= 1 YR <= 2 YR | X1 | NO | --- |
| CHAIN STORE #72 | W_72_1111 | P5555 | UP TO 70% OF RETAIL PRICE | ANY | ANY | X4 | NO | 1/2 OF TOTAL |
| JOE'S STORE SAM'S STORE CHAIN STORE #72 | SR1115 | P2222 | >= $0.75 | WEEKLY; MONTHLY | ANY | X1, X5 | NO | --- |

FIG. 5

| | START DATE 614 | END DATE 616 | DATE OF LAST REDEMPTION 618 | QUANTITY REMAINING 620 | PENALTY 622 | STATUS 624 |
|---|---|---|---|---|---|---|
| | 9/1/02 | 9/1/03 | 10/15/02 | 22 | - | VALID |
| | 5/3/02 | - | 9/9/02 | - | X3, X5 | VALID |
| | FIRST DAY OF SUMMER | FIRST DAY OF WINTER | 10/12/02 | 2 | X4 | VALID |
| | 3/3/02 | 9/3/02 | 6/9/02 | 8 | X5 | INVALID |

| SETTLED PARTY 702 | SETTLEMENT PRICE 704 | SETTLEMENT SCHEDULE 706 | COMMISSION FEE 708 |
|---|---|---|---|
| SAM'S STORE | SUBSCRIPTION PRICE | AT REDEMPTION | --- |
| JOE'S STORE | RETAIL PRICE | UPFRONT, AT BEGINNING OF SUBSCRIPTION | $10 FOR EACH SUBSCRIPTION ESTABLISHED |
| BIG STORE | AVERAGE OF RETAIL AND SUBSCRIPTION PRICES | EVERY WEEK | $15 FOR EACH SUBSCRIPTION FULFILLED |
| CHAIN STORE | 95% OF RETAIL PRICE | AT END OF SUBSCRIPTION | $5,000 FOR EVERY 1,000 SUBSCRIPTIONS ESTABLISHED |
| LITTLE STORE | RETAIL PRICE MINUS SUBSCRIPTION PRICE | AT REDEMPTION | -- |

FIG. 7

| SUBSIDY IDENTIFIER 802 | SUBSIDY PROVIDER 804 | OBLIGATION 806 | SUBSIDY AMOUNT 808 |
|---|---|---|---|
| SUB123 | MCI | SWITCH TO MCI LONG DISTANCE | $50 |
| SUB234 | VISA | APPLY FOR A GOLD VISA CARD | $35 |
| SUB345 | NABISCO | SUBSCRIBE TO 2 OR MORE NABISCO PRODUCTS | $20 |

| PENALTY CODE 902 | PENALTY DESCRIPTION 904 | PENALTY CONDITION(S) 906 |
|---|---|---|
| X1 | LOSE INITIAL DEPOSIT, END SUBSCRIPTION | END DATE PAST AND QUANTITY REMAINING >0 |
| X2 | LOSE FREQUENT SHOPPER BENEFITS | PRODUCT UNREDEEMED FOR OVER 3X THE FREQUENCY PERIOD |
| X3 | RAISE SUBSCRIPTION PRICE $0.05 | FREQUENCY CONDITION UNMET |
| X4 | CHARGE $5.00, END SUBSCRIPTION | END DATE PAST AND QUANTITY REMAINING >0 |
| X5 | EXTEND DURATION ONE WEEK | FREQUENCY CONDITION UNMET |

| MODIFICATION REQUEST 1002 | MODIFICATION RULE 1004 | MODIFICATION PENALTY 1006 |
|---|---|---|
| EXTEND DURATION | 1 REQUEST PER SUBSCRIPTION | $2.00 |
| SHORTEN DURATION | 1 REQUEST PER SUBSCRIPTION | INCREASE SUBSCRIPTION PRICE BY 10% |
| INCREASE FREQUENCY | ANY TIME | N/A |
| DECREASE FREQUENCY | MUST BE BY LESS THAN 50% | EXTEND DURATION BY 1 MONTH |
| SKIP A FREQUENCY TERM | ANY TIME | N/A FOR FIRST 3, $2.00 EACH ADDITIONAL |
| END SUBSCRIPTION EARLY | 1 REQUEST PER CUSTOMER PER 6 MONTHS | LOSE DEPOSIT, IF ANY |
| RENEGOTIATE SUBSCRIPTION PRICE | ANY TIME | N/A |

FIG. 10

METHOD AND APPARATUS FOR MANAGING SUBSCRIPTIONS

CROSS-REFERENCE TO RELATED APPLICATIONS

This application is a divisional of U.S. patent application Ser. No. 09/538,805 filed Mar. 30, 2000 now U.S. Pat. No. 7,251,617, entitled METHOD AND APPARATUS FOR MANAGING SUBSCRIPTIONS, the entirety of which is incorporated herein by reference for all purposes.

U.S. patent application Ser. No. 09/538,805 claims the benefit of priority of U.S. Provisional Application No. 60/165,366 filed Nov. 12, 1999, entitled SUBSCRIPTION GROCERIES the entirety of which is incorporated herein by reference for all purposes.

U.S. patent application Ser. No. 09/538,805 is a continuation-in-part of U.S. patent application Ser. No. 09/221,457, filed Dec. 28, 1998, entitled METHOD AND APPARATUS FOR DETERMINING A SUBSCRIPTION TO A PRODUCT IN A RETAIL ENVIRONMENT, which issued as U.S. Pat. No. 6,415,262 on Jul. 2, 2002 the entirety of which is incorporated by reference herein for all purposes.

This application is related to the following U.S. patent applications:

U.S. patent application Ser. No. 10/642,894, filed Aug. 18, 2003, entitled METHOD AND APPARATUS FOR IDENTIFYING POTENTIAL BUYERS;

U.S. patent application Ser. No. 10/124,809, filed Apr. 17, 2002 entitled METHOD AND APPARATUS FOR FACILITATING PURCHASE AGREEMENTS WITH A RETAILER;

U.S. patent application Ser. No. 09/540,709, filed Mar. 31, 2000 and now abandoned entitled SYSTEM TO ESTABLISH A CUSTOMER-SPECIFIED PRICE OF A PRODUCT AND TO MANAGE REDEMPTION OF THE PRODUCT AT THE ESTABLISHED PRICE;

U.S. patent application Ser. No. 09/349,860, filed Jul. 8, 1999 and now abandoned entitled METHOD AND APPARATUS FOR IDENTIFYING POTENTIAL BUYERS;

U.S. patent application Ser. No. 09/340,953, filed Jun. 28, 1999 entitled SYSTEM AND METHOD FOR ESTABLISHING AND MANAGING SUBSCRIPTION PURCHASE AGREEMENTS INCLUDING COMMITMENTS TO PURCHASE GOODS OVER TIME AT AGREED UPON PRICES; and U.S. patent application Ser. No. 08/889,589, filed on Jul. 8, 1997 and issued as U.S. Pat. No. 5,970,470 on Oct. 19, 1999 entitled SYSTEM AND METHOD FOR ESTABLISHING AND MANAGING SUBSCRIPTION PURCHASE AGREEMENTS INCLUDING COMMITMENTS TO PURCHASE GOODS OVER TIME AT AGREED UPON PRICES the entirety of which is incorporated by reference herein for all purposes.

FIELD OF THE INVENTION

The present invention relates to sales methods and apparatus. More particularly, embodiments of the present invention relate to subscription sales techniques.

BACKGROUND OF THE INVENTION

Retail competition is intense. Single-store merchants compete with chain-stores. Chain-stores compete with bulk purchasing or warehouse clubs. And, more recently, brick-and-mortar retailers compete with Internet retailers. Chain-stores, bulk purchasing clubs, warehouse clubs, and Internet retailers (generally referred to herein as "discounters") generally attempt to increase their revenues by attracting a greater volume of customers and increasing sales. Competition for customers has had a dramatic impact on traditional retailers. For example, while the grocery industry has enjoyed an increasing market size, the market share of conventional supermarkets and groceries has dwindled below their once-controlling interest. In large part, this drop in market share has been caused by competition from discounters such as bulk purchasing clubs.

Retail discounters have identified and are exploiting a lucrative portion of the retail market—customers who are willing to make bulk purchases in exchange for discount prices. Such bulk sales have cut directly into the volume of conventional retailers.

With market share steadily eroding, it has become necessary for conventional retailers to attempt to stem the loss of customers to discount retailers. Due to the fundamental differences in their businesses, however, it is difficult for a conventional retailer to compete with a discount retailer. Further, it is becoming increasingly difficult for discount retailers to compete with each other.

Discount retailers represent a very specialized portion of the retail market. Discount retailers generally locate their facilities in less expensive areas—often occupying warehouse type facilities—while still attracting customers looking for a good deal. They are able to stock a very limited number of types of products because their customers are willing to sacrifice choice for price. As a result, discount retailers are able to sell larger quantities of product per transaction, thereby realizing lower per-sale costs.

Customers generally accept that discount retailers will not offer all of the amenities often provided by conventional retailers. For example, discounters typically do not provide check-cashing services, or bag items at checkout. Further, many discounters operate as "clubs" and enroll customers, as "members" of the club. Customers often are required to pay a membership fee for the right to belong to the "club." Such fees help offset what are traditionally thin margins.

In contrast, conventional retailers typically locate their facilities in areas convenient for their customers, thus often realizing higher real estate costs. They must stock a much larger number of products to attract customers, and they have relatively higher transaction costs due to the typically large quantity of small items per purchase. To compete in their core business, conventional retailers are expected to provide significant customer amenities, without the imposition of any type of service or membership fee.

In addition, conventional retailers typically do not have the physical infrastructure necessary to compete in a traditional bulk selling environment. Because they are located in more expensive facilities, they often have less floor and shelf space, with all available space being used by the large number of products they stock.

In one attempt to compete with discounters, many retailers have implemented frequent shopper programs. In a typical frequent shopper program, a customer is provided with an identification card that is presented at each visit. Records are typically kept of customer purchases, and various discounts and benefits are typically provided to the customer in return for registration and subsequent use of the card.

Frequent shopper programs, however, suffer from relatively limited acceptance by customers. These programs are typically not able to provide prices that are competitive with bulk purchasing programs. Often, discounts are only provided on a few items. Overall, frequent shopper programs do not provide a realistic alternative to customers interested in bulk purchasing. In fact, no systems or methods are known to applicants which permit conventional retailers to compete effectively against discounters.

One method which has been proposed by the assignee of the present invention to allow conventional retailers to compete with discounters is to allow customers to purchase subscriptions to products sold at conventional retailers. This is described in U.S. Pat. No. 5,970,470 entitled SYSTEM AND METHOD FOR ESTABLISHING AND MANAGING SUBSCRIPTION PURCHASE AGREEMENTS INCLUDING COMMITMENTS TO PURCHASE GOODS OVER TIME AT AGREED UPON PRICES, issued to the assignee of the present invention on Oct. 19, 1999, and which is incorporated herein by reference for all purposes.

It would be further desirable to provide a system which allows a customer to establish a subscription to products which are sold at more than one retailer. Preferably, subscriptions to a number of products offered by a number of retailers may be organized by a single entity, providing a customer with a greater sense of control and ability to select and customize subscriptions to a large number of products. It would also be desirable to provide a system which allows retailers to offer subscriptions to a large pool of customers who would otherwise never have heard of the retailer or who would not have known about the subscriptions offered by the retailer. It would be advantageous to provide a method and apparatus that overcame the drawbacks of the prior art.

SUMMARY OF THE INVENTION

Embodiments of the present invention provide a system and method for managing subscriptions to products. Embodiments of the present invention alleviate problems inherent in the prior art and promote commerce.

According to embodiments of the present invention, a customer may establish a subscription to a product with any of a number of retailers by establishing the subscription through a centralized system. In one embodiment, a subscription is established by first receiving information identifying a customer and a product. At least one retailer that offers the product is then identified, and terms of a subscription for the product are established. The established subscription is identified by a redemption identifier that is communicated to the customer. The customer is then able to redeem subscription products at the retailer by identifying the subscription using the redemption identifier.

Embodiments of the present invention further include a system and method for tracking fulfillment of the subscription. Tracking fulfillment may be performed by the centralized system, by the retailer, by the customer, and/or a combination of different parties.

Embodiments of the present invention also include a system and method for facilitating monetary settlement between parties.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 3 is a table illustrating an exemplary data structure of a product database for use in the present invention;

FIG. 4 is a table illustrating an exemplary data structure of a customer database for use in the present invention;

FIG. 5 is a table illustrating an exemplary data structure of an available subscription database for use in the present invention;

FIG. 7 is a table illustrating an exemplary data structure of a settlement database for use in the present invention;

FIG. 8 is a table illustrating an exemplary data structure of a subsidy database for use in the present invention;

FIG. 9 is a table illustrating an exemplary data structure of a penalty database for use in the present invention;

FIG. 10 is a table illustrating an exemplary data structure of a modification database for use in the present invention;

DETAILED DESCRIPTION OF THE INVENTION

Figure 1:
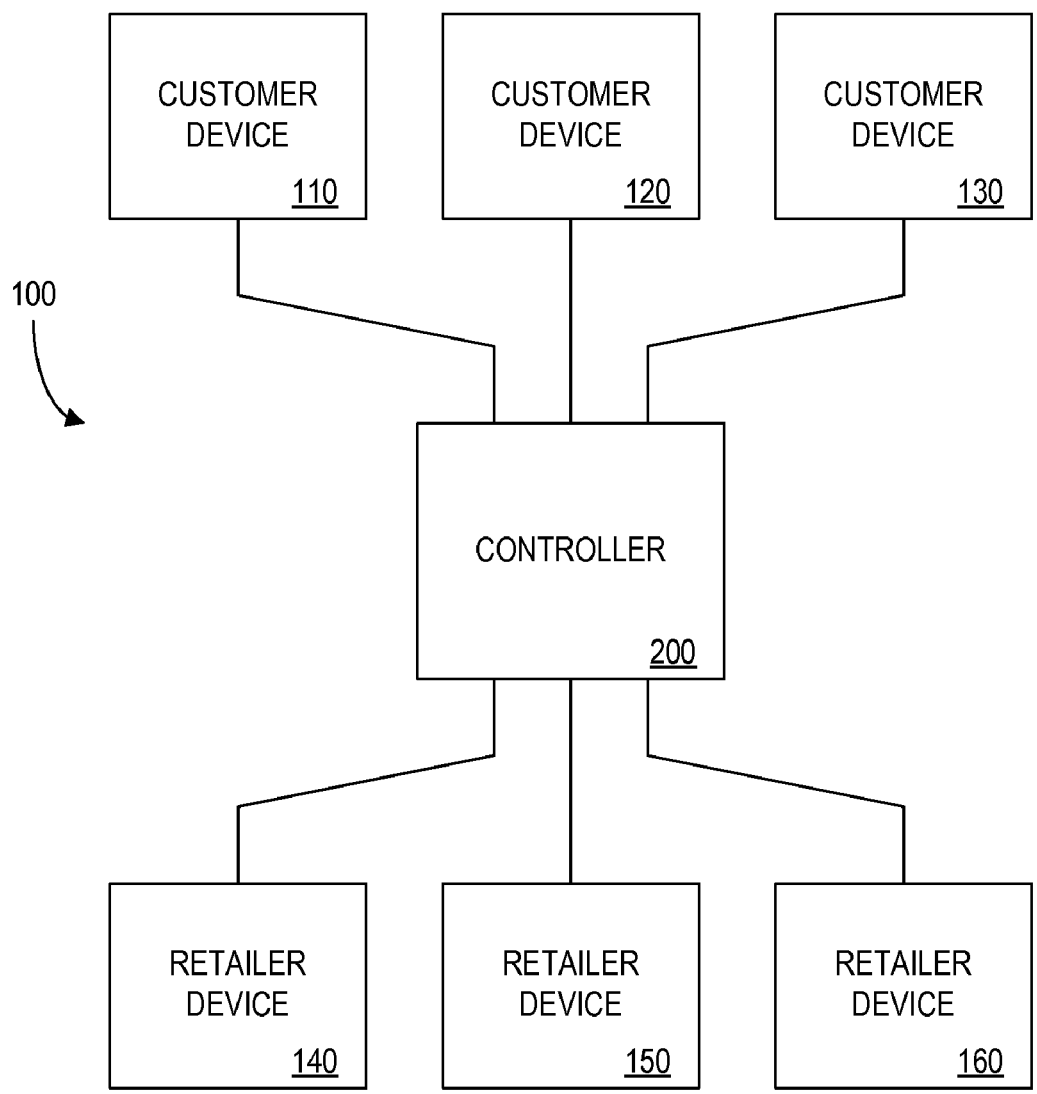
FIG. 1 is a block diagram of a system consistent with the present invention.

Applicants have recognized that a need exists for a system and method that allows customers to establish subscriptions to products that may be redeemed at a number of different retailers. In addition, Applicants have recognized that a need exists for an ability to track the fulfillment and perform settlement functions to manage those subscriptions. Customers, retailers, and product manufacturers all benefit from embodiments of the present invention which allow customers to establish subscriptions to products from a wide variety of retailers.

For example, retailers benefit through an ability to reach a larger pool of potential customers and by accessing information about each customer's buying behavior and information about other subscriptions held by each customer. Retailers will reap further benefits from an ability to better predict product demand. Both traditional retailers and discounters benefit from this ability to offer subscriptions to customers. Manufacturers benefit from an ability to directly offer discounts and other incentives to customers and through an ability to mold customer behavior and establish long-term customer loyalty. Customers benefit through increased cost savings and an ability to customize subscriptions to the customers'particular needs. Embodiments of the present invention also give customers the ability to shop for and negotiate subscriptions which best meet their needs for multiple types of products at a single location across different types of retailers (e.g., hardware stores, clothing stores, supermarkets, etc.).

For consistency and simplicity of reference throughout the specification, Applicants will use the following terms throughout the specification. "Retailer" is used to refer to any vendor of items, goods, or services. "Product" is used to refer to any item, good, or service. Other terms will be introduced throughout the specification. Further, a number of price terms will be used. The term "retail price" will be used to refer to a price per unit of a product which is established, e.g., by a manufacturer or retailer. The retail price generally refers to the price a customer would typically pay for the product before any discounts or without use of embodiments of the present invention. The term "subscription price" is generally used herein to refer to the price established, using techniques of the present invention, per unit of a product in a subscription. The subscription price may be preestablished (e.g., established in the available subscription database 500 of FIG. 5) or it may be established through negotiation or otherwise specified by the customer (e.g., established in the active subscription database 600 of FIG. 6). The term "total subscription price" is used to refer to the sum total of the subscription prices paid during the term of a subscription. Finally, the term "settlement price" is used to refer to the amount which one party (e.g., a manufacturer, retailer, or an entity operating a controller 200 of FIG. 1) agrees to pay to another party (e.g., a manufacturer, retailer, or an entity operating the controller 200 of FIG. 1) in consideration for processing a subscription according to the present invention. These terms will be discussed in further detail below.

System

Referring now to FIG. 1, an apparatus 100 according to an embodiment of the present invention includes a controller 200 that is in communication with one or more customer devices 110, 120 and 130, and with one or more retailer devices 140, 150 and 160. The controller 200 may communicate with the customer devices 110, 120 and 130 and the retailer devices 140, 150 and 160 directly or via a network such as the Internet. Each of the customer devices 110, 120 and 130, and the retailer devices 140, 150 and 160 may comprise computers, such as those based on the INTEL® Pentium® processor, that are adapted to communicate with the controller 200.

Any or all of the customer devices 110, 120 and 130 and the retailer devices 140, 150 and 160 may be, e.g., conventional personal computers, kiosks, portable types of computers, such as a laptop computer, a palm-top computer, a hand-held computer, a telephone, a cellular telephone, or a Personal Digital Assistant (PDA). Further, any or all of the retailer devices 140, 150, and 160 may be point of sale terminals or other devices operating at retailer points of sale. Any number of customer devices and retailer devices may be in communication with the controller 200.

The controller 200 may be operated by or on behalf of a service provider or other entity offering the service of providing and managing subscriptions. The controller 200 may also be operated by or on behalf of an entity such as a financial institution, financial authorization network or other entity that receives and processes financial transactions from multiple retailers. Further, the controller 200 may be operated by or on behalf of one or more product manufacturers and/or retailers. The term "controller 200" will be used herein to conveniently refer to both the device (e.g., the device depicted in FIG. 2) as well as the operation of the controller 200 by an entity or entities (e.g., a service provider or other party).

Communication between the customer devices 110, 120 and 130, and the retailer devices 140, 150 and 160 and the controller 200 may be direct or indirect, such as over the Internet through a Web site maintained by the controller 200 on a remote server or over an on-line data network including commercial on-line service providers, bulletin board systems and the like. In yet other embodiments, the devices may communicate with the controller 200 over radio frequency (RF), cable television (TV), satellite links and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The controller 200 may function as, or in conjunction with, a "Web server" that generates Web pages (documents on the Web that typically include an HTML file and associated graphics and script files) that may be accessed via the Web and allows communication with the controller 200 in a manner known in the art.

Devices

Figure 2:
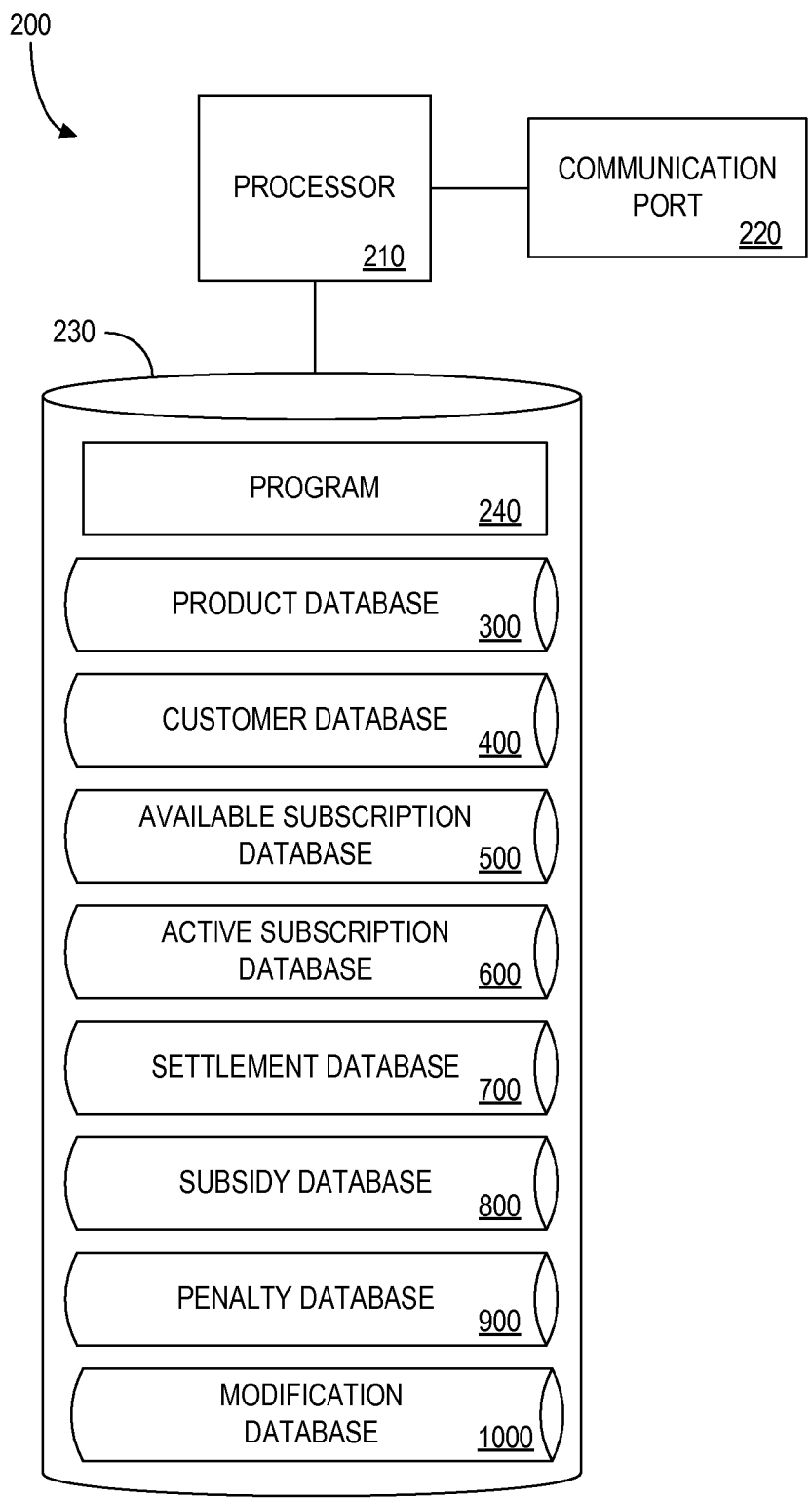
FIG. 2 is a block diagram of one embodiment of the controller depicted in FIG. 1.

FIG. 2 illustrates an embodiment of the controller 200. The controller 200 may be implemented as a system controller, a dedicated hardware circuit, an appropriately programmed general purpose computer, or any other equivalent electronic, mechanical or electromechanical device.

The controller 200 comprises a processor 210, such as one or more Intel® Pentium® processors. The processor 210 is in communication with a communication port 220 through which the processor communicates with other devices. The processor 210 is also in communication with a storage device 230. The storage device 230 comprises an appropriate combination of magnetic, optical and/or semiconductor memory, and may include, for example, Random Access Memory (RAM), Read-Only Memory (ROM), a compact disc and/or a hard disk. The processor 210 and the storage device 230 may each be, for example: (i) located entirely within a single computer or other computing device; or (ii) connected to each other by a remote communication medium, such as a serial port cable, telephone line or radio frequency transceiver. In one embodiment, the controller 200 may comprise one or more computers that are connected to a remote server computer for maintaining databases.

The storage device 230 stores a program 240 for controlling the processor 210. The processor 210 performs instructions of the program 240, and thereby operates in accordance with the present invention, and particularly in accordance with the methods described in detail herein. The program 240 may be stored in a compressed, uncompiled and/or encrypted format. The program 240 furthermore includes program elements that may be necessary, such as an operating system, a database management system and "device drivers" for allowing the processor 210 to interface with computer peripheral devices. Appropriate program elements are known to those skilled in the art, and need not be described in detail herein.

According to an embodiment of the present invention, the instructions of the program 240 may be read into a main memory from another computer-readable medium, such from a ROM to RAM. Execution of sequences of the instructions in program 240 causes processor 210 to perform the process steps described herein. In other embodiments, hard-wired circuitry may be used in place of, or in combination with, software instructions for implementation of the processes of the present invention. Thus, embodiments of the present invention are not limited to any specific combination of hardware and software.

In the embodiment depicted in FIG. 2, the storage device 230 also stores (i) a product database 300, (ii) a customer database 400, (iii) an available subscription database 500, (iv) an active subscription database 600, (v) a settlement database 700, (vi) a subsidy database 800, (vii) a penalty database 900, and (viii) a modification database 1000. The databases 300-1000 are described in more detail below and are depicted with exemplary entries in the accompanying figures. As will be described in more detail below, some or all of the information contained in the databases 300-1000 may be stored in storage devices associated with the customer devices 110, 120 and 130 and/or the retail devices 140, 150, and 160.

Databases

Reference will now be made to FIGS. 3-10 which include tabular representations of the databases 300-1000, respectively. Each of the tabular representations of databases include a number of example records or entries, each of which includes one or more fields. Each of the depicted fields has a field name. In referring to the tabular representations, reference to specific fields will be made using the field name and the corresponding field element number. Those skilled in the art will recognize that any number of records or fields may be provided.

As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein.

Product Database

Reference is now made to FIG. 3, which is a tabular representation of the product database 300. Each example record or entry of the product database 300 defines a specific product for which a subscription is available. This database may be established by the controller 200, by retailers, and/or by manufacturers. In general, the product database 300 contains information used to identify and describe products for which subscriptions are available or for which subscriptions may be established using embodiments of the present invention. The term "product" is used herein to generically refer to goods, products, services or other items that are purchased or consumed.

The tabular representation of the product database 300 includes a number of fields which specify (i) a product identifier 302, (ii) a product description 304, and (iii) a retail price 306. For each entry of the product database 300, the product identifier 302 may be established by the controller 200 or may be automatically assigned by the controller 200 as new products or sets of products are identified as available for subscriptions. The product identifier 302 may be a product name or any code or identifier (such as a Universal Product Code, or "UPC") suitable for uniquely identifying a product, a type of product, or a set of products. The product description 304 may be any information used to describe the product or set of products identified by the product identifier 302, and the retail price 306 may be any information used to specify a retail price for that product or set of products identified by the product identifier 302.

Customer Database

FIG. 4 is a tabular representation of the customer database 400 which includes a number of example records or entries each defining a specific customer who is currently participating (or has participated) in the subscription system. In one embodiment, the customer database 400 is established and maintained by the controller 200. Information stored in the customer database 400 is used to identify and track information about customers who are establishing or who have established subscriptions using embodiments of the present invention. In one embodiment, this information is provided by a customer when a customer first establishes a subscription.

The tabular representation of the customer database 400 includes a number of fields for each record or entry, specifying (i) a customer identifier 402, (ii) customer data 404, (iii) a payment identifier 406, (iv) a set of contact information 408, (v) an active subscription identifier 410, and (vi) a subsidy(s) 412.

For each entry of the customer database 400, the customer identifier 402 is used to uniquely identify a particular customer, and may be any code or identifier associated with the customer or generated by the controller 200 that identifies the customer. For example, the customer identifier may be the customer's name, a credit card or other payment account number, a social security number, a drivers license number, a telephone number, a frequent shopper card number, biometric information associated with the customer, or any other code or identifier which may be used to uniquely identify the customer. The payment identifier 406 is used to identify a payment account which the customer provides for use in paying amounts or receiving credits associated with subscriptions. For example, in one embodiment, the customer may pay the controller 200 (or an entity operating the controller 200) for a subscription using the payment account identified by the payment identifier 406. In other embodiments, this information is used to pay a retailer and/or a product manufacturer. Further, in some embodiments, the payment account identified by the payment identifier 406 is charged for penalties levied against the customer. In some embodiments, the payment identifier 406 is used to make payments to the customer, e.g., where the customer has earned a refund or credit.

For each entry of the customer database 400, the customer data 404 may be, e.g., a customer name or any other information used to identify a particular customer. Customer contact information is specified in contact information 408, and may include, for example, a customer address, telephone number, and/or electronic address.

For each entry of the customer database 400, the active subscription identifier 410 is used to identify any subscription(s) entered into by the customer identified by the associated customer identifier 402. The subsidy(s) 412 is used to identify any subsidy(s) associated with the customer identified by the associated customer identifier 402. In some embodiments, as will be discussed further below, customers may receive subsidy amounts in conjunction with certain subscriptions. These subsidy amounts may be provided based on a number of different criteria or will be discussed below.

Available Subscription Database

FIG. 5 is a tabular representation of the available subscription database 500 which includes a number of example records or entries each defining the terms and details of a subscription which is available. In one embodiment, the data for the available subscription database 500 is generated by retailers who offer subscriptions to products. For example, a retailer may choose to define specific terms of an available subscription and submit those terms to controller 200 for inclusion in the available subscription database 500. This allows the controller 200 to search for an available subscription that may meet a customer's needs. As will be discussed in more detail below, in some embodiments, new subscriptions may be created based on available subscriptions or they may be created based on information provided by the customer, retailers, and manufacturers or other parties.

The tabular representation of the database 500 also defines a number of fields for each record, specifying (i) a retailer

502, (ii) an available subscription identifier 504, (iii) a product identifier 506, (iv) a subscription price 508, (v) a frequency 510, (vi) a duration 512, (vii) a penalty 514, (viii) a modification 516, and (ix) a deposit amount 518.

For each entry of the available subscription database 500, the retailer 502 is data identifying a particular retailer offering a particular subscription. The retailer 502 may be data identifying a retail chain or it may be data specifying a particular store or group of stores. Further, the retailer 502 may be data identifying a manufacturer or other entity which allows customers to purchase subscription products according to the present invention. The data specified by the available subscription identifier 504 identifies a particular subscription offered by the retailer 502. The available subscription identifier 504 may be a unique number or code assigned to the subscription by the controller 200 or it may be an identifier selected or generated by the retailer.

The product identifier 506 identifies a particular product offered in a subscription identified by the available subscription identifier 504. The product identifier 506 may be the same as, or related to, product identifier 302 of FIG. 3. The product identifier 506 may identify a single, specific product, a product category, or a group of products. An example of a product category is "CEREAL," or "SOFT DRINKS." Products in the "SOFT DRINK" category may include specific brands of soft drinks. A group of products may be any group of more than one product. A group of products may be formed from unrelated products.

For each entry of the available subscription database 500, the subscription price 508 identifies a specific price or price range for each subscription product in a subscription identified by the available subscription identifier 504. The subscription price 508 may be identified, for example, by a set dollar amount, a range of prices, and/or a percentage of a price such as the retail price of the product identified by corresponding product identifier 506. Retailers may use any of a number of ways to define the subscription price 508 for an available subscription. For example, in one embodiment, the subscription price 508 is a fixed price per unit of the subscription product identified by the product identifier 506. Further, the retailer may establish a subscription price 508 that varies during the term of a subscription. For example, the subscription price may decrease progressively per unit of product purchased during the term of a subscription. The subscription price 508 may be the lowest retail price on the subscription product that occurs during the term of the subscription. Further still, the subscription price 508 may be an initial retail price that is "locked in" for a customer so that the price doesn't change despite fluctuations in the retail price of the product.

Embodiments of the present invention also permit a retailer to define available subscriptions in a manner that allows a customer to pay a different price per unit of a subscription. Other pricing arrangements are also possible using techniques of the present invention. Some of these arrangements will be described in more detail below in conjunction with the description of the active subscription database 600.

For each entry of the available subscription database 500, a frequency 510 identifies the frequency of an available subscription identified by the available subscription identifier 504. For example, a retailer may require that, for a certain subscription, individual products be purchased on a weekly or monthly basis. The duration 512 identifies a duration of the subscription identified by the available subscription identifier 504. Information regarding penalty(s) that are associated with a particular subscription is specified by the penalty(s) 514. In the depicted embodiment, the penalty(s) associated with a subscription are defined by reference to penalty terms which are defined in the penalty database 900 (described further in conjunction with FIG. 9). A modification 516 is also shown in the tabular representation of the available subscription database 500. The modification 516 contains information about whether, and in what circumstances, modifications to the terms of a subscription may be made. The deposit amount 518 identifies whether a deposit amount must be paid by a customer signing up for the subscription, and if so, the value of the required deposit amount for a particular subscription identified by the available subscription identifier 504.

Active Subscription Database

Figure 6A:
FIG. 6 is a table illustrating an exemplary data structure of an active subscription database for use in the present invention.

Referring now to FIGS. 6A and 6B, a tabular representation of the active subscription database 600 is shown which includes a number of example records or entries each defining an active subscription which has been established. The active subscription database 600 is established and maintained by controller 200 using data provided by retailers, manufacturers and customers. The data for each record in the active subscription database 600 defines an active subscription that has been established for a particular customer. The active subscription includes information identifying the customer as well as terms and conditions of the active subscription. The terms and conditions of an active subscription may be established by the controller 200, the retailer, the manufacturer, the customer, or any combination of the parties when a customer establishes a subscription. Certain fields of the active subscriptions database 600 may be directly derived from the available subscription database 500, e.g., where the terms of an available subscription meet the needs of a particular customer.

The tabular representation of the active subscription database 600 defines fields for each of the entries or records, specifying (i) a redemption identifier 602, (ii) a customer identifier 604, (iii) a subscription product 606, (iv) a subscription price 608, (v) a frequency 610, (vi) a retailer 612, (vii) a start date 614, (viii) an end date 616, (ix) a date of last redemption 618, (x) a quantity remaining 620, (xi) a penalty 622, and (xii) a status 624.

For each entry of the active subscription database 600, the data specified by the redemption identifier 602 is used to access or identify the details of a particular subscription established by the system for a particular customer. The redemption identifier 602 may be a unique number or code generated by the controller 200 or another entity to uniquely identify a particular subscription as associated with a particular customer. In some embodiments, the redemption identifier 602 is formed from information which identifies terms of a particular subscription. For example, the redemption identifier 602 may include a retailer identifier, a product identifier, a subscription price, and a unique number identifying a particular subscription. The redemption identifier 602 may be, for example, a sixteen digit number that includes a four digit retailer identifier, a four digit product identifier, a four digit subscription price, and a four digit number identifying a particular subscription. A customer uses this redemption identifier 602 to identify the active subscription established for the customer.

The subscription may be associated with a particular customer identified by customer identifier 604. In other embodiments, a customer may remain anonymous. The customer identifier 604 may be the same as, or related to, the customer identifier 402 of FIG. 4.

Data specified by the subscription product 606 identifies the particular product which is the subject of the subscription identified by the redemption identifier 602. The subscription product may be identified by a number or code such as the product identifier 302 of FIG. 3. The subscription product 606 may specify varying levels of product details. For example, a product may be identified by brand and size, or product code, or it may simply be specified by product category or group. In some embodiments, the subscription product 606 may initially be non-brand specific, but become brand-specific once the customer activates the subscription by redeeming a first subscription product of a particular brand. Further, in some embodiments, customers may establish subscriptions to any product sold by a retailer (i.e., the subscription product 606 is broadly defined as any product sold by the retailer). In other embodiments, the subscription product 606 is a group of products. Where the subscription product 606 is a group of products or any product at a retailer, the retailer may be allowed to choose specific products from the group each week to move slow inventory.

In yet another embodiment, the subscription product 606 may be undefined. Instead, the customer may simply establish a subscription to all products at a retailer and commit to spend at least a certain amount (the subscription price 608) at the retailer on a regular basis (the frequency 610). In other embodiments, the subscription product 606 may be defined based on the occurrence or non-occurrence of other conditions. For example, the customer may subscribe to a fruit of the week at a retailer, and the retailer may be able to select the fruit (e.g., based on availability, etc.).

Data specified by the subscription price 608 is also included for each subscription and may be, for example, the price, per unit of the subscription product, agreed-upon between the controller 200 and the customer as discussed below. The subscription price 608 may be the same as the subscription price 508 of the available subscription database 500 (FIG. 5). In some embodiments, the subscription price is negotiated or otherwise defined by agreement with the customer. The subscription price 608 may be defined in a number of ways. For example, the subscription price 608 may be: a fixed dollar amount less than the retail price, a percentage of the retail price, an amount that decreases with each redemption, an amount that increases with each redemption, an amount equal to the lowest retail price of the product during the term of the subscription, an amount that decreases as time passes, etc.

Further, the subscription price 608 may be defined in a manner that allows a customer to pay a different price per unit of a subscription. For example, a customer may pay a different price per gallon of milk in a milk subscription, so long as the total amount paid for the subscription equals an agreed-to amount. For example, the active subscription database 600 may define a total subscription price (not shown) for a subscription. If the total subscription price for a milk subscription is $50.00 for twenty five gallons of milk, the system may allow the customer to pay $1.00 per gallon for the first twenty gallons and $6.00 per gallon for the final five gallons (or any other combination which equals the total price of $50.00). Alternatively, or in addition, the subscription price 608 may be established as a variable price. For example, the subscription price 608 that is established for a particular subscription may be defined as "20% LESS THAN THE RETAIL PRICE". This value may vary as the retail price fluctuates.

The subscription price 608 (as well as other subscription terms) may depend on other factors as well. For example, the subscription price 608 may vary based on factors such as the frequency and duration of the subscription (e.g., the price may be lower for a subscription redeemed frequently and for a long period of time), the quantity of the subscription product, etc. The subscription price 608 may also depend on other subscriptions which have been established for a particular customer. For example, the loyalty of a customer who has established many subscriptions with a particular retailer may be rewarded by giving that customer a further reduced subscription price 608. As another example, a customer who establishes multiple active subscriptions with the same retailer may receive a discount or other benefit. A customer may also receive a reduced subscription price 608 (or other favorable terms) if the customer establishes subscriptions at cooperating retailers or manufacturers. Those skilled in the art will recognize that other pricing schemes may be used according to embodiments of the present invention.

The frequency 610 includes data specifying a frequency term associated with the subscription identified by the redemption identifier 602. The frequency is a term established between the controller 200, the customer, and/or the retailer that specifies the frequency with which a customer must redeem subscription products to stay in compliance with the terms of the subscription. The frequency 610 may be dictated by frequency terms specified by the retailer in the available subscription database 500. Data specified by the retailer 612 identifies one or more retailers at which the subscription may be redeemed by the customer. The retailer 612 may be established at the time of purchasing the subscription or it may be established at a later time (e.g., it may be established when the customer first redeems the subscription).

A start date and an end date of the subscription are specified by data in fields 614 and 616, respectively. These dates are used to specify the beginning and expiration of the subscription and may be used, for example, to track whether the subscription is valid. The subscription start date 614 may be any of a number of dates, including the date the subscription is established, the date the customer first redeems a subscription product, and/or the date that a condition is fulfilled (e.g., the birth of a child, the date that the outside temperature exceeds 80° F., the date that baseball season starts, etc.). The subscription end date 616 may also be any of a number of dates, including: a date at the end of an agreed-upon subscription term, and a date that an agreed-upon event occurs (e.g., a child's birthday, the date that the outside temperature first falls below 32° F., the date that the baseball season ends, etc.). In some embodiments, a subscription may have an indefinite end date 616 and/or an unspecified start date 614.

A date of last redemption 618 is used, for example, to track whether the customer is redeeming subscription products with the requisite frequency (i.e., according to the frequency specified in field 610). Data specified by the quantity remaining 620 tracks the quantity of subscription products that remain unredeemed as of the date of last redemption 618.

Data specified by the penalty 622 identifies whether one or more penalties have been assessed to the particular subscription identified by the redemption identifier 602. In the depicted embodiment, the penalty 622 is defined by reference to the penalty database 900. As will be discussed further below, a penalty may be assessed if a customer violates one or more terms of the subscription. Data specified by the status 624 may be used to indicate a status of the subscription identified by the redemption identifier 602. For example, a particular subscription may be tagged as being "INVALID" once the end date 616 has passed or after the quantity remaining 620 is equal to zero.

Other data may also be specified in the active subscription database 600. For example, data regarding a required payment type may also be specified for a given active subscription. In some embodiments, an active subscription may be financial account specific and require that the customer use the specified amount (e.g., identified by a specified credit or debit card) each time the customer makes a subscription purchase. In some embodiments, customers are encouraged to establish multiple subscriptions using the same financial account. The issuer of the financial account may subsidize subscriptions that require payment using a specified financial account (e.g., a credit card issued by a particular financial institution).

The active subscription database 600 may also specify specific dates or times on which the customer must redeem subscription products. This allows a retailer to directly influence customer traffic flow.

In some embodiments, terms of a subscription may be changed based on the settlement term (discussed further below). For example, the controller 200 may lower a subscription price 608 if the controller 200 will receive a high settlement price for the subscription.

Settlement Database

Reference is now made to FIG. 7, which is a tabular representation of the settlement database 700 which includes a number of example records or entries each defining terms and procedures used to settle amounts owed between parties (e.g., between the controller 200, retailers, and/or manufacturers). In some embodiments, the settlement database 700 may be maintained and controlled by the controller 200, although the database 700 may be maintained and/or controlled by other entities as well. For example, settlement may be performed by a payment network or other entity that operates to move funds and data between parties. The settlement database 700 contains data and information used to facilitate settlement of funds owed between parties in the subscription system of the present invention. Settlement may occur between, for example, the controller 200, manufacturers, and retailers. The settlement database 700 is referenced when settlement is performed.

The tabular representation of the settlement database 700 defines fields for each of the entries or records, which specify (i) a settled party 702, (ii) a settlement price 704, (iii) a settlement schedule 706, and (iv) a commission fee paid to central system 708.

For each entry of the settlement database 700, the data specified by the settled party 702 specifies a party with which the controller 200 has established a settlement relationship. The settled party 702 is, for example, a participating retailer or manufacturer. The data specified by the settlement price 704 identifies the price term by which the controller 200 agrees to reimburse the settled party 702. For example, in embodiments where the customer pays the subscription price to the controller 200, the controller 200 may later settle with a retailer by paying the retailer an agreed upon settlement price for the subscription (e.g., the retail price minus a commission fee). In embodiments where the customer pays the subscription price directly to a retailer, the controller 200 may settle with the retailer by paying the retailer the settlement price (e.g., the difference between the retail price and the subscription price or some other agreed-to amount). In some embodiments, the retailer may agree to pay the controller 200 a commission fee 708 for each subscription or an amount each time a subscription product is redeemed.

The settlement database 700 may specify terms under which the controller 200 settles with other parties as well. For example, the controller 200 may pay, or receive payment from, a product manufacturer (e.g., the manufacturer may agree to pay the controller 200 a commission fee 708 for each subscription including one of the manufacturer's products) and/or a financial institution (e.g., the financial institution may agree to pay the controller 200 a set fee for each subscription which requires the use of a credit card issued by the financial institution).

The settlement database 700 may further specify terms by which the controller 200 facilitates settlement between other parties. For example, the controller 200 may facilitate settlement between retailers, manufacturers and other parties, such as financial institutions. In some embodiments, a manufacturer may pay a retailer an agreed-to amount for supporting or providing manufacturer-specific subscriptions. In other embodiments, a credit card issuing bank may pay the retailer or manufacturer an agreed-upon commission fee 708 for supporting subscriptions using the issuing bank's cards or for providing other promotional support.

In some embodiments, the settlement price 704 may depend on the terms of a particular subscription. For example, the settlement price 704 may be higher for subscriptions having longer durations or larger amounts of subscription products. In other embodiments, the settlement price 704 may include funds collected from penalties imposed on customers. As will become apparent upon reading this disclosure, other settlement terms and procedures may also be established.

For each entry of the settlement database 700, the data specified by the settlement schedule 706 identifies the timing of settlement between the central system and the settled party 702. A wide variety of settlement schedule terms may be specified, e.g., at redemption, on an established periodic basis, at the end of the subscription, etc. The data specified by the commission fee 708 identifies a fee (if any) to be paid to the central system and agreed to by the settled party 702. A wide variety of fee arrangements may be used in embodiments of the present invention. For example, in one embodiment, the settlement terms may depend on a particular customer (e.g., a manufacturer may pay a larger fee for a customer who frequently purchases subscriptions to the manufacturer's products).

Subsidy Database

Referring now to FIG. 8, a tabular representation of the subsidy database 800 is shown, which includes a number of example records or entries each defining a subsidy and details of the subsidy which may be offered to a customer. In some embodiments of the present invention, the subsidy database 800 is maintained and controlled by the controller 200, although the subsidy database 800 may be maintained and/or controlled by other parties as well. The subsidy database 800 includes data and information used to define different subsidy offers which may be presented to customers who establish subscriptions using the present invention. Subsidies can be targeted to specific customers or customers who meet certain criteria. For example, larger subsidy amounts may be presented to customers who have established many subscriptions in the past. The subsidy database 800 may also include data and information used to define different subsidy offers which are valid for specific products. Data for the subsidy database 800 may be provided from different parties offering subsidies. According to certain embodiments of the present invention, the subsidy database 800 is referenced when a customer establishes a subscription to a product for which a subsidy is offered.

The tabular representation of the subsidy database 800 defines fields for each of the entries or records and specifies (i) a subsidy identifier 802, (ii) a subsidy provider 804, (iii) an obligation 806, and (iv) a subsidy amount 808.

For each entry of the subsidy database 800, the data specified by the subsidy identifier 802 identifies a particular subsidy. The subsidy identifier 802 may be, e.g., a unique number or code used to uniquely identify a particular subsidy. Data specified by the subsidy provider 804 is used to identify the provider of the subsidy identified by the subsidy identifier 802. Data specified by the obligation 806 identifies one or more obligations that must be met by a customer for the customer to qualify for the subsidy in the amount specified by the subsidy amount 808.

Penalty Database

FIG. 9 is a tabular representation of the penalty database 900 which includes a number of example records or entries each defining a particular penalty which may be levied against certain customers who fail to comply with term(s) of a subscription. According to certain embodiments of the present invention, the penalty database 900 is maintained and controlled by the controller 200, although other entities may also maintain and/or control the database 900 as well. The penalty database 900 contains data and information defining different penalties and conditions under which those penalties may be imposed on a customer. These penalties and conditions may be established by the controller 200, a retailer, a manufacturer or a combination of those entities.

The tabular representation of the penalty database 900 defines fields for each of the entries or records. The fields specify (i) a penalty code 902, (ii) a penalty description 904, and (iii) a penalty condition(s) 906. For each entry of the database 900, the data specified by the penalty code 902 includes information identifying a particular penalty that may be levied against a customer. For example, a customer may incur a penalty for violating one or more terms of a subscription, such as a failure to comply with terms specifying (i) the subscription product 606, (ii) the subscription price 608, (iii) the frequency 610, (iv) the retailer 612, (v) the start date 614, or (vi) the end date 616. Further, in certain embodiments, a customer may incur a penalty for failing to use an agreed-upon payment card.

A description of the penalty associated with the penalty code 902 is specified in the penalty description 904, and condition(s) associated with the penalty are set forth in condition(s) 906. The penalty may be any of a number of types of penalties, such as (i) the loss of some benefit the customer would have otherwise been entitled to if the subscription were fully complied with (e.g., a low subscription price), (ii) the loss of benefits related to a subscription (e.g., frequent shopper club benefits), (iii) termination of the subscription, (iv) increasing the subscription price, or (v) a financial penalty levied against the customer (e.g., charging a predefined fine amount to a customer). Further, the penalty may be a reduction or change in terms of the subscription. For example, if the subscription price is one that decreases progressively per unit of product purchased, the penalty may involve (i) resetting the subscription price to be equal to the retail price of the subscription product, (ii) causing the subscription price to remain at a set price without decreasing for a period, or (iii) increasing the subscription price by an amount.

In some embodiments, financial penalties are levied against a customer by charging an amount to the customer's payment account (identified by the payment identifier 406 stored in the customer database 400 of FIG. 4). In other embodiments, financial penalties are levied by keeping some or all of the deposit amount 518 (FIG. 5) paid by the customer. The penalty amount can be determined in any of a number of different ways, e.g., by penalizing the customer an amount equal to the amount of discounts the customer received with respect to a given subscription. The penalty amount can be calculated in other ways as well. For example, the penalty amount may be calculated based on (i) the subscription price, (ii) the retail price of the subscription product at the end of the subscription, (iii) the average, lowest, or highest retail price of the subscription product during the subscription, and (iv) a price agreed-upon by the customer and the controller 200.

In some embodiments, the penalty associated with the penalty code 902 may involve withholding an amount from the customer until the customer fulfills the terms of the subscription. The amount withheld may be obtained from the customer upfront (e.g., the deposit amount 518 of FIG. 5) or may be collected during the course of the subscription. At the end of the subscription period, if no penalty is assessed, the customer will receive the total amount withheld. If the customer violates one or more terms of the subscription agreement, the amount may be kept by the controller 200 and/or retailer.

In some embodiments, the customer is given the opportunity to cure a violation before being penalized. For example, in some embodiments, a customer who misses a redemption may be given an extension of time during which to fulfill the conditions of the subscription.

In some embodiments, the penalty database 900 may also include a penalty code 902, penalty description 904, and penalty condition(s) 906 which apply to a retailer. For example, the penalty conditions 906 may specify that the retailer will be penalized for hindering or preventing a customer from fulfilling his subscription (e.g., if the retailer runs out of the product). The retailer may be required to offer the customer a further discount on the product, or provide the customer with a coupon or rain check. Further, the customer may be allowed to redeem the subscription product at a different retailer or to exchange it for a different product. This ensures that customers are not penalized for stocking or supply problems of the retailer.

Those skilled in the art will recognize that other penalty arrangements may be used in embodiments of the present invention.

Modification Database

FIG. 10 is a tabular representation of the modification database 1000 which includes a number of example records or entries each defining the terms associated with a particular modification request which may be received concerning subscriptions established using the present invention. In one embodiment, the database 1000 includes a number of different types of modifications which may be permitted for different subscriptions. In generating an active subscription, one or more of the types of modifications may be specified as available for the active subscription. The listing of types of modifications in database 1000 may not be exhaustive. Customers and retailers may agree to different modification terms when establishing active subscriptions.

Each record or entry of the modification database 1000 includes a number of fields which specify (i) a modification request 1002, (ii) a modification rule 1004, and (iii) a modification penalty 1006. For each entry of the database 1000, the data specified by the modification request 1002 identifies a particular type of modification request that may be made by, e.g., a customer or retailer participating in the system. For example, a customer having a subscription may request that the duration of an established subscription be extended or shortened (i.e., a request to enter "EXTEND DURATION," or "SHORTEN DURATION"). A wide variety of types of modifications may be included in the modification request 1002 of the database 1000. Each modification request 1002 may have an associated modification rule 1004 (e.g., conditions on the frequency or timing of a particular request) and an associated modification penalty 1006 (e.g., a fee to be charged for the modification, etc.).

In some embodiments, customers may be allowed to request a "TRANSFER" of the subscription to another customer. For example, an existing customer who currently has a one-year subscription to bananas may decide after four months that he no longer wishes to maintain the subscription. If the modification database 1000 indicates that a "TRANSFER" is an acceptable modification, the customer may find another individual to transfer the subscription to. In some embodiments, a subscription exchange or other forum may be established by the controller 200 to facilitate the identification of such transferees. In some embodiments, the "TRANSFER" may simply entail transferring the terms of the subscription to the new customer. In other embodiments, the transfer may require the transfer of funds such as an initial deposit (or portion of the deposit) to the new customer. In some embodiments, a "TRANSFER" may be used to replicate the terms of an active subscription for one or more new customers.

In other embodiments, customers may be allowed to request a "ROLLOVER" of the subscription to a new subscription product. For example, if a customer establishes a one-year subscription to "HAMBURGER" and thereafter decides to become a vegetarian, the customer may be allowed to modify the subscription by changing it into a subscription to "SOY BURGERS." In some embodiments, the customer may be required to pay a modification penalty 1006 for this modification.

In other embodiments, customers or the retailer may be allowed to "TERMINATE" a subscription. For example, a customer may be allowed to prematurely end a subscription due to changed circumstances. Again, this may require the payment of a modification penalty 1006 for the termination. Similarly, a retailer may be permitted to "TERMINATE" a subscription due to changed circumstances such as the unavailability of the subscription product. The retailer may be subject to a modification penalty 1006 or be required to refund some or all of the customer's money or provide an acceptable substitute.

Process Description

Process Overview

Figure 11:
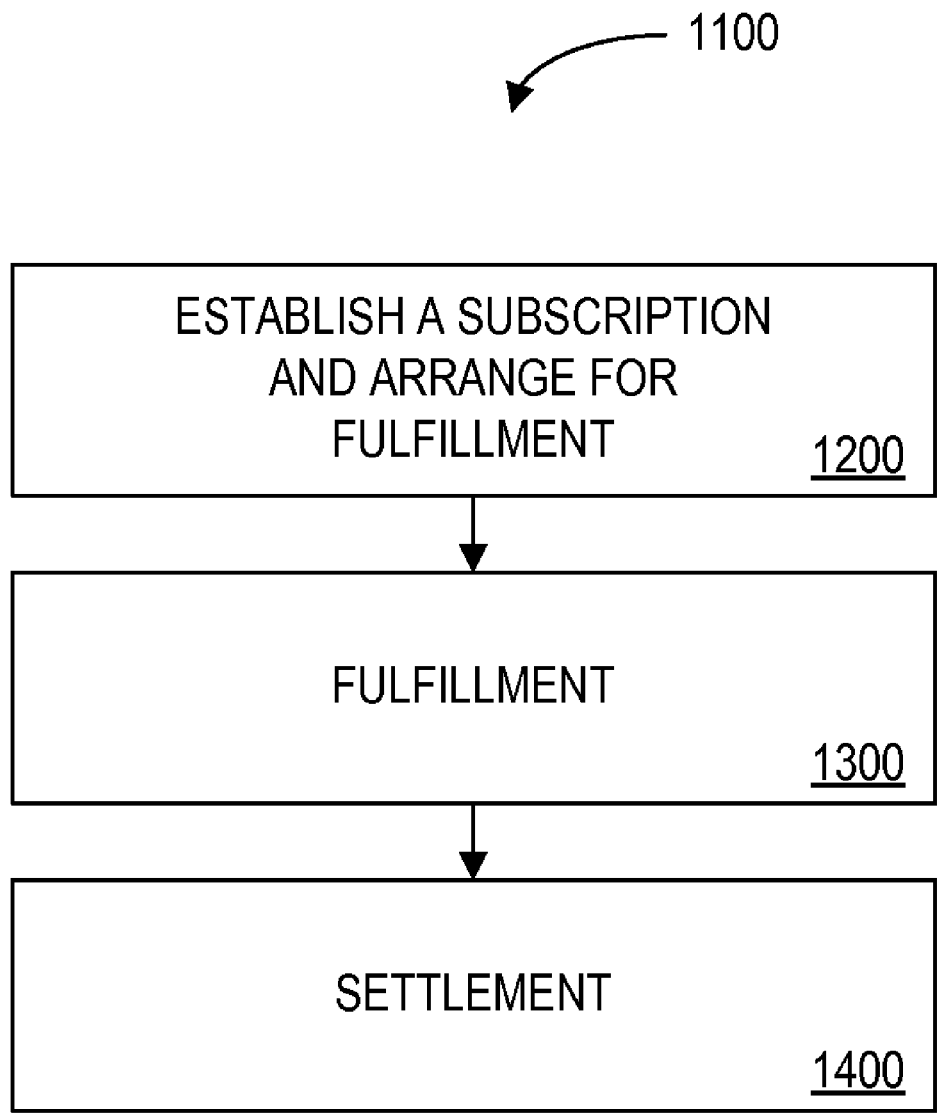
FIG. 11 is a flow diagram illustrating an exemplary subscription process according to an embodiment of the present invention.

A process of the present invention will now be described to illustrate how subscriptions may be established and redeemed and how parties may settle funds among one another. Referring to FIG. 11, a flow chart 1100 represents a process according to an embodiment of the present invention that may be performed by the controller 200 in conjunction with a customer device 110 and a retailer device 140 (FIG. 1). The particular arrangement of elements in the flow chart of FIG. 11, as well as the other flow charts discussed herein, is not meant to imply a fixed order to the steps; rather, embodiments of the present invention can be practiced in any order that is practicable.

According to an embodiment of the present invention, the subscription management process 1100 begins with the establishment of a subscription and arranging for fulfillment of the subscription (at 1200). A customer, or group of customers, establishes a subscription by communicating with the controller 200 and by selecting and negotiating terms of a subscription for a product or set of products. In some embodiments, customers may select subscriptions to products based on retailer, manufacturer, product, and/or product category. Terms of a subscription may be set by the retailer or manufacturer, or some or all of the terms may be negotiated by the customer. Once a subscription is established, the system operates to arrange for fulfillment. This can be performed in a number of ways. For example, the controller 200 may forward details regarding a particular subscription to a retailer so the retailer has those details before the customer arrives to redeem the subscription. As an alternative example, the controller 200 does not communicate subscription information to retailers; instead, the customer may be given subscription identifying information which the customer presents to the retailer at the time of purchasing a subscription product. The retailer then contacts the controller 200 for authorization of the purchase transaction. Other techniques for arranging fulfillment will become apparent upon reading this disclosure. A further discussion of the establishment of a subscription and arranging for fulfillment is provided in conjunction with FIG. 12.

Once a subscription has been established, processing continues to a fulfillment process 1300. As will be discussed in further detail below in conjunction with FIG. 13, the fulfillment process 1300 may be performed in a number of different ways. For example, in a controller-based embodiment, the controller 200 performs the function of tracking and authorizing subscription fulfillment by receiving an authorization inquiry from participating retailers for each subscription redemption request. In a retailer-based embodiment, the retailer device 140 performs some or all of the function of tracking fulfillment by tracking individual transactions involving subscriptions redeemed at that retailer. Further, in a customer-based embodiment, the customer device 110 performs some or all of the function of tracking fulfillment by tracking individual redemption transactions of a particular customer.

The subscription process 1100 also includes a settlement process 1400. Settlement 1400 will be described in more detail below in connection with FIG. 14, and may take several forms and involve several different parties. For example, the controller 200 may agree with retailers and manufacturers to reimburse the retailers and manufacturers for fees and costs associated with participating subscriptions. Settlement 1400 between parties may be performed on a periodic or otherwise agreed-to basis.

The result is a system which allows customers to purchase subscriptions to products from a large number of retailers. Embodiments of the present invention provide an efficient and centralized system for the establishment, fulfillment, and settlement of subscriptions among multiple customers and retailers.

Subscription and Arranging Fulfillment Process

Figure 12:
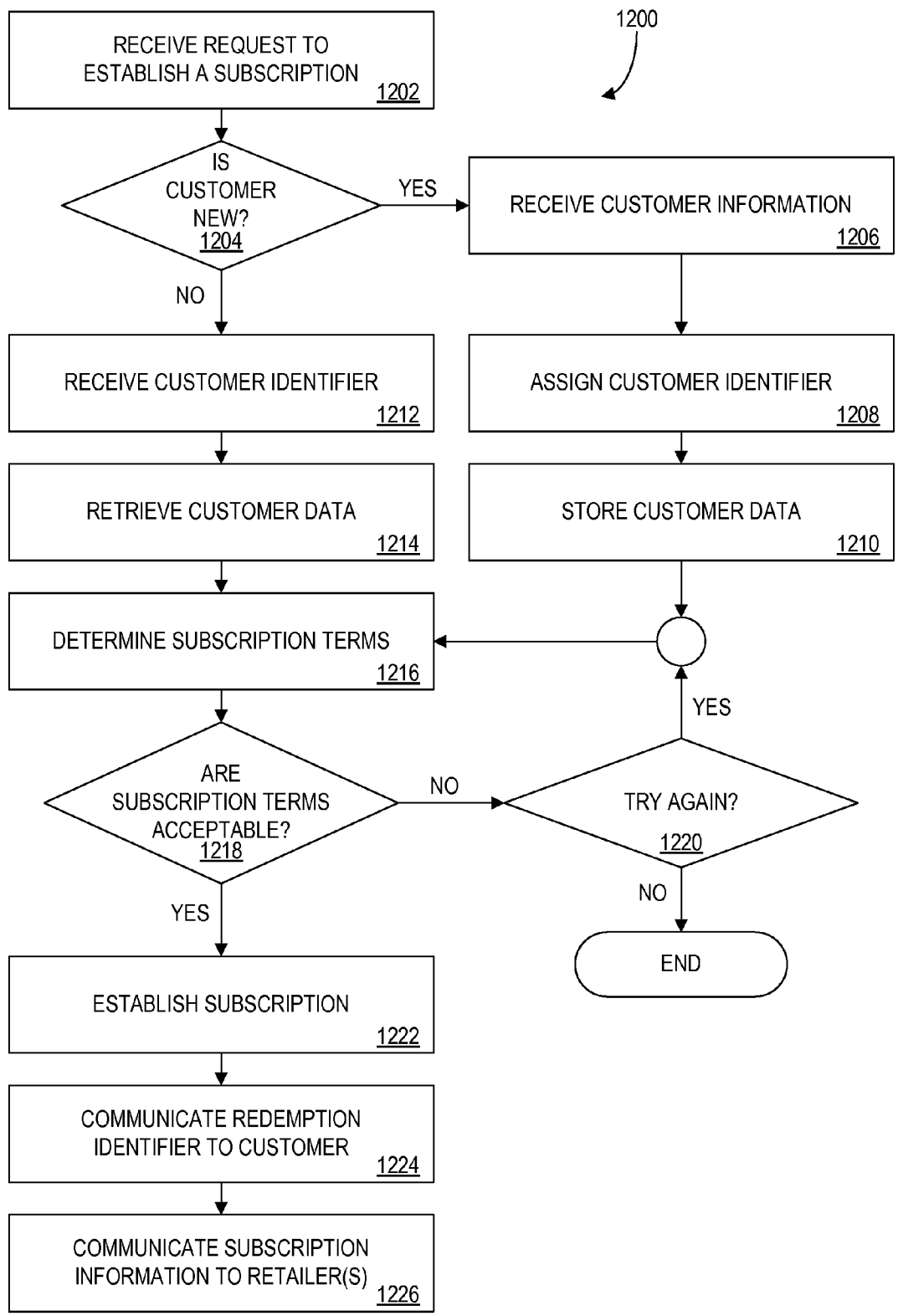
FIG. 12 is a flow diagram illustrating an exemplary process for establishing a subscription according to an embodiment of the present invention.

One embodiment of a process 1200 for establishing a subscription and arranging fulfillment is described by referring now to FIG. 12. The process 1200 typically begins with the receipt, by the controller 200, of a request to establish a subscription at 1202. The request may be generated by a prospective customer operating a customer device 110 in communication with the controller 200. Alternatively, a customer may communicate with the controller 200 via a point of sale device (such as the retailer device 140) located at a retailer location.

Upon receipt of the request to establish a subscription, a determination is made whether the customer is a new customer (at 1204). If so, processing proceeds to 1206 where customer information is received. This information may be received by the controller 200 in a variety of manners. For example, in an Internet Web-based environment, the customer may be prompted to provide information, and information may be received by the controller 200, using electronic forms or other well-known techniques. As another example, the customer may establish a subscription using a telephone and interact with the controller 200 via an interactive voice response unit (IVRU). Further, the customer may establish a subscription using traditional mail or electronic mail.

The controller 200, upon receipt of the customer information, will generate or assign a customer identifier at 1208.

This customer identifier and the customer information are stored at 1210. As an example, illustrated by reference to the customer database 400 of FIG. 4, the customer information received at 1206 includes the customer data 404 (e.g., the customer's name), the payment identifier 406 (e.g., a credit card number), and the contact information 408 (e.g., the customer's address). The customer identifier 402, as depicted in the first record of the customer database 400, may be the same as the payment identifier 406. Alternatively, or in addition, the customer identifier 402 may be a unique number, code or other indicia generated by the controller 200 for each customer.

If, at 1204, a determination is made that the customer is an existing customer, the customer may simply provide an existing customer identifier 402 (at 1212). The controller 200 then retrieves customer data (at 1214). In some embodiments, such as Internet-based embodiments where the customer uses a Web "browser" to interact with the controller 200, the customer identifier 402 may be stored in the customer's browser as a "cookie" so that the customer may be automatically identified to the controller. In some embodiments, customers who are repeat customers are rewarded. For example, customers may be rewarded with more beneficial subscription terms based on the number of subscriptions the customer has with (i) the controller 200, (ii) each retailer, or (iii) each manufacturer. Further customers may be rewarded for their use of a particular credit card or financial account.

Once the customer has been identified to the controller 200, processing proceeds to 1216 where the system functions to determine subscription terms. This may occur in a number of ways. For example, a customer may contact controller 200 and browse through a menu or selection of available subscriptions. The customer may also request a specific product and construct a new subscription for that product. The customer may also specify one or more desired term(s) of the subscription, such as a desired price, a desired brand, a desired quantity, etc. Further, the customer may specify certain terms and specify an acceptable range for other terms. In some embodiments, the customer may weight desired terms. For example, the customer may indicate that a desired subscription price is the most important term and that the specific retailer is less important. Further, the customer may submit offers for multiple subscriptions and indicate that being able to pick up all of the subscription items at a single retailer is the most important criteria.

The customer may specify or establish ranges for all of the terms or may allow the controller 200 to supply certain terms. The controller 200 may then create or select an appropriate subscription based on the customer's request. In some embodiments, the controller 200 may perform a screening process to ensure the customer's request meets minimum subscription requirements established by the controller 200, retailers, and manufacturers.

As an example illustrated by reference to the product database 300 of FIG. 3 and the available subscription database 500 of FIG. 5, the customer may request a subscription to SOFT-brand toilet paper, in 4-roll packages (identified in the product database 300 as having a product identifier 302 of "P1111"). This product identifier 302 is used to determine whether any subscriptions are available to that particular product. Reference to the available subscriptions database 500 shows that several retailers offer subscriptions to product "P1111"—"JOE'S STORE" (under the available subscription identifier 504 "SR1111") and "SAM'S STORE" (under the available subscription identifier 504 "AP1111"). In establishing a request for the subscription, the customer may be presented with several choices. For example, the customer may be presented with a list of penalties from which to choose. The customer's selection of penalties and other terms may have a direct impact on the subscription price or other subscription terms (for example, a customer who is willing to accept severe penalties may receive a lower subscription price because that customer is less likely to breach the subscription agreement).

In one embodiment, the respective terms of these available subscriptions are retrieved and presented to the customer without modification by the controller 200 (e.g., they are determined by the retailer and/or manufacturer). The customer is then given the opportunity to determine whether the terms are acceptable at 1218. In other embodiments, the terms of the available subscriptions may be modified by the controller 200 before they are presented to the customer. For example, referring to available subscription "SR1111" of FIG. 5, the controller 200 may modify the subscription price 508 and offer the subscription to the customer at a price of "$1.25" (per unit of the subscription). This modification complies with the retailer's requirement that the subscription price be greater than or equal to "$0.99" per unit. The controller 200 may further modify the available subscription by specifying that the frequency be "WEEKLY" for one year. This subscription, as modified by the controller 200, may then be presented to the customer for approval.

In some embodiments, the controller 200 forwards a customer's request on to one or more retailers, manufacturers, or other entities for their review and acceptance. These parties may generate a counter-offer to a customer's request which may be presented to the customer by the controller 200. Customer's may enjoy better subscription terms as a result of competition between multiple parties.

In some embodiments, the controller 200 and/or the retailer or manufacturer (via the controller 200) may offer the customer a lower subscription price if the customer agrees to modify other terms of the subscription. For example, a retailer may offer a lower subscription price to a customer who agrees to increase the subscription frequency 610, the penalty 622, or the duration of the subscription. Further, a customer may be presented with a subsidy offer which may reduce the price of the subscription or modify other terms of the subscription. The subsidy may be a subsidy defined in, e.g., subsidy database 800 (FIG. 8).

Alternatively, or in addition, the customer may be given the opportunity to dictate or modify some or all of the terms of the subscription. For example, the customer may specifically request a one year subscription, on a weekly basis, to SOFT-brand toilet paper for a per-unit price of "$1.50". The controller 200, using this information, determines that at least two available subscriptions satisfy the customer's request: "JOE'S STORE's" available subscription number "SR1111" and "SAM'S STORE's" available subscription number "AP1111." Once the controller 200 and the customer have arrived at an agreement regarding the terms and conditions of the new subscription, processing continues to 1222 where the subscription is established. In one embodiment, described by referring to FIG. 6, the subscription is established by assigning a redemption identifier 602 to a new entry in the active subscription database 600. The terms and conditions of the agreed-upon subscription are associated with the redemption identifier 602. As an example, referring to the first depicted record of the active subscription database 600, a redemption identifier 602 of "R5555" is used to refer to a subscription established for customer identifier "234-678-9011" (Ms. Bethany Jones identified in the customer database 400) which requires Bethany to purchase SOFT-brand toilet paper (product identifier "P1111") each week for a year at "SAM'S STORE." In return, Bethany receives the subscription price of $1.50 per unit of the subscription. In this example, no penalty 622 will be imposed if Bethany fails to comply with the terms of the subscription.

In some embodiments, establishment of a subscription 1222 may leave one or more terms of the subscription open. For example, in one embodiment, a subscription may be established without final selection of a specific retailer at which the subscription may be redeemed (e.g., the retailer 612 of FIG. 6 may be left blank at the end of the process of establishing a subscription). In this embodiment, the final selection of the retailer may be completed when the customer redeems the first product of a subscription at a participating retailer. As an example, a customer may establish a subscription that has an undefined retailer 612. The customer may be presented with a list of retailers at which the subscription will be accepted. The customer may then finalize the establishment of the subscription by redeeming the first product of the subscription at a participating retailer (that is, a retailer that was on the list provided to the customer and which honors subscriptions established by the controller 200). This allows a customer to select a favorite or most convenient retailer for the subscription.

In some embodiments of the present invention, establishment of a subscription 1222 may require that the customer pay a total subscription price (e.g., the subscription price multiplied by the number of products in the subscription) to the controller 200 at the time of establishing the subscription, or each time the customer redeems a subscription product. In other embodiments, the customer pays the retailer each time the customer redeems a subscription product. Further, the retailer and/or the customer may agree to pay a fee to the controller 200 for establishing the subscription.

Once the subscription is established, a redemption identifier is communicated to the customer at 1224. This may be performed in any of a number of ways. For example, the redemption identifier may be communicated via an IVRU, over the Internet, via mail, etc. In embodiments where privacy and security are desired, the redemption identifier may be encrypted or otherwise encoded in a manner which prevents unauthorized parties from receiving or using the redemption identifier.

In some embodiments, subscription information is also communicated to retailer(s) at 1226. For example, the details of a particular subscription may be forwarded to the retailer or retailers at which the subscription will be honored. In other embodiments, the particular retailer(s) are not identified until later in the process and no subscription information can be forwarded. In still other embodiments, no information need be communicated to the retailer until a retailer contacts the controller 200 to authorize a subscription transaction.

Fulfillment Process

Figure 13:
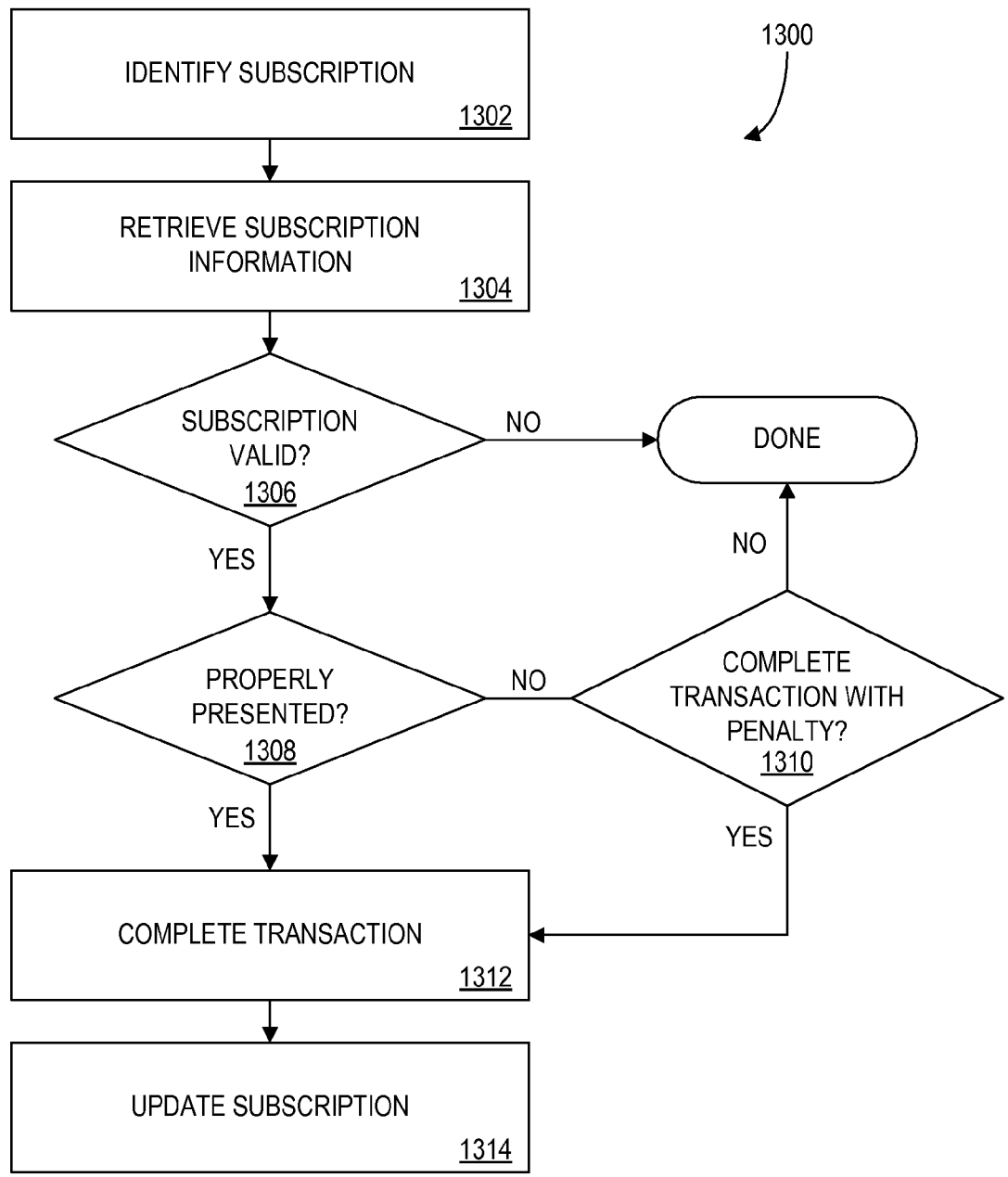
FIG. 13 is a flow diagram illustrating an exemplary process for the fulfillment of a subscription according to an embodiment of the present invention.

A process 1300 for arranging for the fulfillment of the subscription is described by referring now to FIG. 13. The fulfillment process 1300 begins at 1302 where a subscription is identified. A subscription may be identified, for example, when a customer presents a product for purchase at, e.g., a retail point of sale. For example, the customer may indicate that the product is part of a subscription by entering the redemption identifier 602 into retailer device 140. Further, the retailer device 140 may automatically determine that the product is part of a subscription, for example, by reading a frequent shopper card presented by the customer. The frequent shopper card may store information that allows the retrieval or identification of the redemption identifier 602. As a further example, a subscription may be identified by forwarding customer information and product information to the controller 200 for authorization of a transaction. Any of these techniques may be used to identify a subscription at 1302.

In one embodiment, once the redemption identifier 602 has been presented to the retailer device 140, the redemption identifier 602 is used to retrieve information about the subscription at 1304. The information retrieved can include information from active subscription database 600 (FIG. 2). In some embodiments, the information is retrieved from the customer (e.g., from a frequent shopper card, smart card, or PDA carried by the customer), from the retailer (e.g., from information stored at the retailer device regarding the active subscriptions offered by a particular retailer), and/or from the controller 200.

At 1306 a check is made to determine whether the subscription identified by the redemption identifier 602 is still valid. For example, this determination may be made based on retrieving the end date 616 (FIG. 6B) and comparing it with the current date to determine if the subscription has expired. Alternatively, or in addition, the check can involve retrieving information regarding the quantity remaining 620 (FIG. 6B) and determining whether the subscription has any units of products remaining for redemption. If the subscription is no longer valid, processing may terminate. Alternatively, the customer may be given the option to renew or reestablish the subscription, e.g., by following the procedure for establishing a subscription set forth above and described in conjunction with FIG. 12.

If the check at 1306 ascertains that the subscription is valid, processing continues to 1308 where a determination is made whether the subscription has been properly presented. For example, this may include ascertaining that the product being purchased by the customer is the subscription product 606 (FIG. 6A). Further, the identity of the retailer can be compared with the stored information about the retailer 612 (FIG. 6A). Other checks may also compare the start date 614 (has the start date arrived yet?), and the frequency 610 and the date of last redemption 618 (is the customer redeeming with the appropriate frequency?). These checks may be conducted locally if the retailer stores information about the subscription. Alternatively, or in addition, the checks may require that contact with the controller 200 or some other third party (such as a credit card network) be established. For example, an authorization request may be communicated from the retailer device 140 to the controller 200 transmitting information about the requested transaction. The controller 200 can then perform the checks to determine if the subscription is valid (at 1306) and if the subscription is properly presented (at 1308) and respond with an authorization or a denial of the transaction. In another embodiment, the checks at 1306 and 1308 may be performed by querying a customer device such as a smart card or frequent shopper card which stores or is associated with information about the subscription.

If the checks show that the customer is not redeeming the subscription properly (that is, the customer is in violation of one or more terms and conditions of the subscription as defined in active subscription database 600), a determination is made at 1310 whether a penalty should be assessed. As an example, if the check at 1308 reveals that the customer is not complying with the frequency term of the subscription (as defined by field 610 of FIG. 6) and the penalty code (as defined by field 622 of FIG. 6 and fields 902-906 of FIG. 9) indicates that a penalty is to be applied for violations of the frequency term, the transaction may be completed, but only after a penalty has been applied. In this example, the penalty is "RAISE SUBSCRIPTION PRICE $0.05" (as defined by the penalty description 904 associated with the penalty code "X3"). After assessing the penalty, processing continues to 1312 where the transaction is completed. In some embodiments, the transaction will not be able to be completed, even with a penalty and processing terminates.

In one embodiment, a customer may be given the opportunity to modify the terms of his subscription. Whether a customer may be given the opportunity to modify the subscription may be set forth, e.g., in modification database 1000 (FIG. 10).

If the checks show that the customer is redeeming the subscription properly (as defined by the terms and conditions of the subscription), processing continues to 1310 where the transaction is completed (i.e., the customer pays the subscription price 608 (FIG. 6A) and receives the subscription product 606). In some embodiments, where the customer paid the subscription price in advance (e.g., during establishment of the subscription), the customer may not need to pay any amount for the subscription product at 1310.

The transaction may be completed at 1310 in a number of ways. For example, in some embodiments, the retailer may perform a price override at a POS terminal to override the retail price for a product and to reflect the subscription price. The price override may also be performed by providing a discount in the amount of the difference between the retail price and the subscription price. This price override may be authorized locally, or it may be authorized by controller 200 or by a third party such as a credit card processor or payment network. In some embodiments, the transaction is completed at 1310 with the customer paying the full retail price for the product and later receiving a credit back for the difference between the retail price and the subscription price. Those skilled in the art, upon reading this disclosure, will recognize that other methods and approaches for completing the transaction may also be used.

Processing continues to 1312 where the subscription is updated to reflect the transaction. For example, information in the active subscription database 600 (FIG. 6) is updated to reduce the quantity remaining 620 and to revise the date of last redemption 618. This updating may be performed locally by the retailer device 140 (FIG. 1) or it may involve transmitting update information to the controller 200, to the customer device 110, or to a customer transaction card or smart card (not shown).

In some embodiments, the fulfillment process 1300 does not involve communication between a retailer and controller 200 for each subscription transaction. Instead, retailers may communicate information about subscriptions to the controller 200 on a periodic basis. For example, a retailer may submit subscription information to the controller 200 on a nightly basis. Further, in certain embodiments, the retailer may only submit information to the controller 200 after a customer has completed a subscription.

In other embodiments, the fulfillment process 1300 requires that the customer (rather than the retailer) interact with the controller 200. For example, a retailer may give a customer a code or confirmation number indicating that the customer has properly redeemed a subscription product or has successfully completed a subscription. The customer may then communicate this code or confirmation number to the controller 200 to inform the controller 200 of the status of the fulfillment. Those skilled in the art, upon reading this disclosure, will recognize that other fulfillment techniques may also be performed.

Settlement Process

Figure 14:
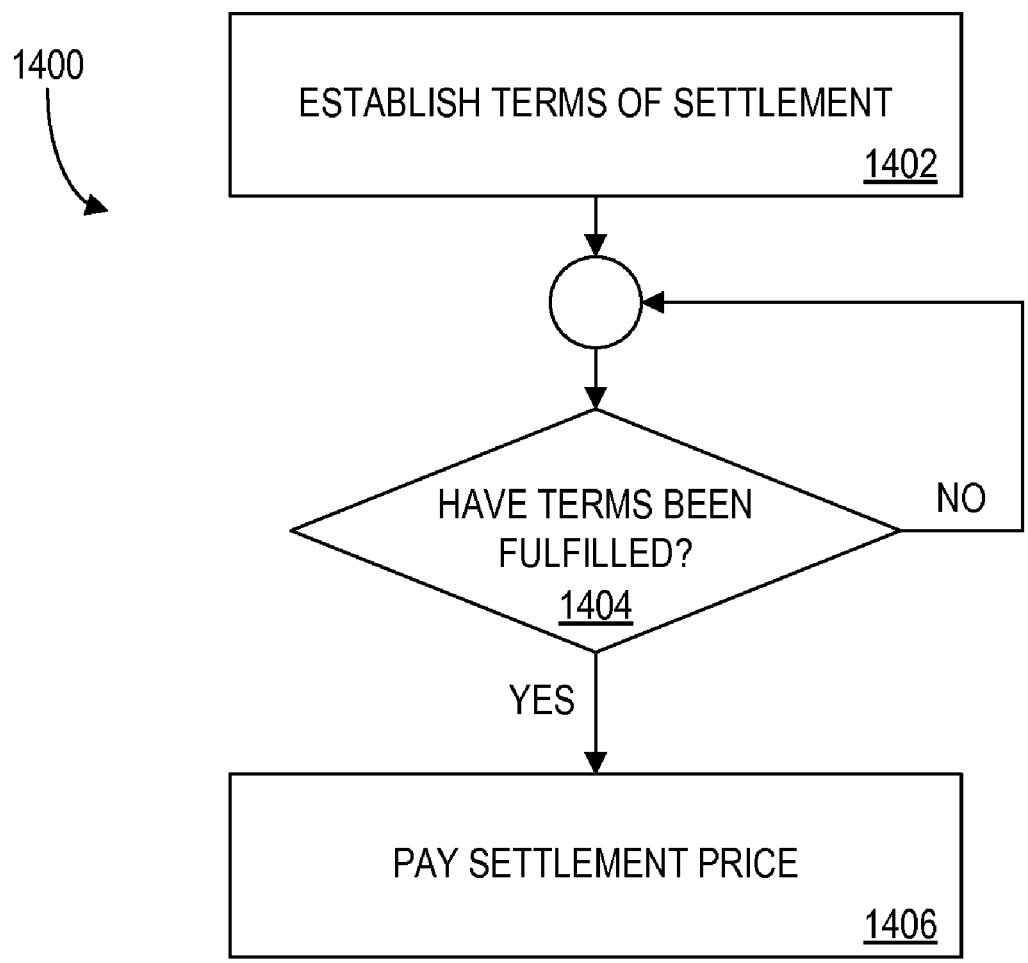
FIG. 14 is a flow diagram illustrating an exemplary process for performing settlement according to an embodiment of the present invention.

FIG. 14 depicts a process for settlement 1400. According to embodiments of the present invention, the settlement process 1400 may occur at different times and in different manners. For example, in one embodiment, the settlement process 1400 occurs one time for each subscription at either the beginning or the end of the subscription. In other embodiments, the settlement process 1400 is performed a number of times during the term of a subscription. For example, a retailer may be paid (or may pay) a fee for each subscription product redeemed.

The terms of settlement are established at 1402. The terms may be established when a retailer or manufacturer first establishes a relationship with the controller 200 or otherwise offering services according to embodiments of the present invention. Settlement terms which may be established are shown in the settlement database 700 (FIG. 7), and may include terms identifying the settled party 702, the settlement price 704, the settlement schedule 706 and the commission fee (if any) 708. Other terms needed to define a settlement relationship may also be established. For example, payment terms may be included if a retailer has specific requirements regarding the form of settlement payments.

Once the settlement terms for a particular party (e.g., retailer or manufacturer) are established, processing continues to 1404 where a determination is made whether the settlement terms have been fulfilled. This may involve, for example, retrieving information about all active subscriptions (e.g., from active subscription database 600 of FIG. 6) relating to a particular retailer or manufacturer and determining whether the status of any active subscriptions requires settlement with a particular retailer or manufacturer. This determination of whether terms have been fulfilled may be performed on a periodic basis (e.g., nightly) or may be performed whenever records of the active subscription database 600 are updated.

If a determination is made that settlement terms with a particular party have been fulfilled, processing continues to 1406 where the settlement price defined in the settlement database 700 (FIG. 7) is paid. This process continues as long as the party continues to be a participant in the system of the present invention. Settlement between other parties may also be facilitated by embodiments of the present invention. For example, settlement between the controller 200 and a manufacturer may be performed where the manufacturer has provided a subsidy for a subscription. As a further example, settlement between a retailer or the controller 200 and a credit card issuer may also be performed.

Additional Embodiments

The following are several examples that illustrate additional embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

According to one embodiment of the present invention, a customer may choose to prepay for the entire subscription. If the customer fails to comply with any of the terms and conditions of the subscription, he may be penalized by withholding one or more subscription products, by losing all or a portion of the prepaid amount, etc. In other embodiments, the customer may choose to pay for the entire subscription in a lump sum during the term of the subscription (e.g., after the first product has been redeemed), or at the end of the subscription.

According to another embodiment, retailers may remind customers who have failed to redeem subscription products. For example, a retailer may identify a customer during a check-out transaction (e.g., via the customer frequent shopper card) and check to see the status of any subscriptions held by the customer. If the customer has one or more subscriptions with the retailer which are delinquent (e.g., one or more subscription products has not been redeemed). The retailer may remind the customer that he needs to redeem the items. This reminder may be presented in a number of ways. For example, a terminal may prompt the cashier to remind the customer or a reminder may be printed on the customer's receipt. In other embodiments, customers may be presented with other types of reminders to redeem subscription products (e.g., e-mail or regular mail reminders may be sent).

According to another embodiment of the present invention, customers who refer new customers to the controller 200 may receive a benefit such as more favorable subscription terms. For example, the controller 200 may track whether a new customer who establishes a subscription was referred by an existing customer. If the new customer is a referral, the existing customer may receive a benefit such as a dollar credit toward the existing customer's next subscription. Those skilled in the art will recognize that other benefits and incentives may also be provided to encourage existing customers to generate referrals.

According to another embodiment of the present invention, upon establishing a subscription, the customer may receive a number of vouchers or coupons for each product in the subscription. The vouchers or coupons may be encoded with information regarding the product, the redemption identifier, and the subscription price. In some embodiments, the customer can pre-pay for the vouchers or coupons. In other embodiments, the voucher or coupon is used to notify the retailer of the subscription price that is to be extended to the customer. In some embodiments each voucher or coupon has a specific date or range of dates for which it is valid. In this manner, the coupons can regulate the frequency requirement of the subscription (e.g., for a four week subscription which is to be redeemed weekly, four coupons dated a week apart can be issued).

In another embodiment, the customer may be a group of individuals who have agreed among themselves to jointly establish a subscription (e.g., to qualify for a larger discount in return for the commitment to purchase a greater quantity of items). As a further embodiment, rather than establish a single group subscription, individuals may be able to link different subscriptions to jointly qualify for greater savings. The members of a group need not know each other or shop at the same retailer. Each member of the group may have separate redemption identifiers that are linked at controller 200, or they may each share the same redemption identifier. Each of the members of the group may keep track of the status of subscriptions through, e.g., a Web site, a kiosk, or through printed status updates on receipts. In one embodiment, the failure of one member of the group to properly redeem subscription items affects the level of benefits that all members of the group receive. Peer pressure from the group should encourage other members to properly redeem items.

A number of additional ways of establishing a subscription may be used. For example, the customer may operate a portable customer device 110 (such as a PDA) and may receive offers for subscriptions, e.g., while shopping at retail stores. Further, subscription offers may be printed on product packaging as, e.g., a scanable product code. A customer may initiate the process for establishing a subscription by presenting the product to a cashier and choosing to accept a subscription to the product. In one embodiment, the initial product (the product scanned at the cashier) is the first product of the subscription. Alternatively, or in addition, the subscription can be established by phoning in a code printed on product packaging.

In other embodiments, a customer may be given the chance to donate some or all of the benefits associated with a subscription to a third party, such as a charity. For example, a customer may choose to donate his savings from the subscription (e.g., the difference between the subscription price and the retail price) to a charity. Further, the terms of a subscription may be defined such that the retailer will donate products or discounts on products to a charity for each subscription established or for each subscription product redeemed. In another embodiment, the customer may choose to pay a higher subscription price per subscription product and to have the extra amount paid credited to a charity or to another customer's subscription.

In other embodiments, a customer may be given the opportunity to change terms of the subscription. For example, a customer may be able to transfer a subscription to another customer. A customer may also be able to sell the subscription back to the controller 200 or the retailer by paying an agreed-upon fee. A customer may also be given the opportunity to, e.g., access a Web site and modify terms of an existing subscription.

Although the present invention has been described with respect to a preferred embodiment thereof, those skilled in the art will note that various substitutions may be made to those embodiments described herein without departing from the spirit and scope of the present invention.

What is claimed is:

1. A process comprising:
receiving, by a controller, a request by a customer to establish a subscription;
receiving, by the controller, information that identifies a product;
identifying, by the controller, at least one supermarket offering the product;
establishing, by the controller, terms of a subscription for the product, in which the subscription is valid at the at least one supermarket, in which the terms include information identifying:
  a subscription price, in which the subscription price is less than a retail price of a unit of the product,
  a frequency of the subscription that indicates a period of time,
  a duration of the subscription, in which the duration of the subscription includes a plurality of the periods of time, and
  in which in order to comply with the frequency of the subscription the customer is required to purchase at least one unit of the product in each respective period of time;
receiving, by the controller and from the customer at a point of sale, an identifier that identifies the subscription;
receiving, by the controller and from the customer at the point of sale, an indication of the product;
determining, by the controller, whether the customer is complying with the frequency of the subscription; and
authorizing, by the controller, the customer to purchase the product at the subscription price if the customer is redeeming the product in accordance with the frequency.

2. A method comprising:
receiving a request by a customer to establish a subscription;
receiving information that identifies a product;
identifying at least one physical retailer offering the product;

establishing, by a controller, terms of a subscription for the product, in which the subscription is valid at the at least one physical retailer, in which the terms include information identifying:
- a subscription price, in which the subscription price is less than a retail price of a unit of the product,
- a frequency of the subscription that indicates a period of time,
- a duration of the subscription, in which the duration of the subscription includes a plurality of the periods of time, and
- in which in order to comply with the frequency of the subscription the customer is required to purchase at least one unit of the product in each respective period of time;

receiving from the customer at a point of sale an identifier that identifies the subscription;

receiving from the customer at the point of sale an indication of the product;

determining whether the customer is complying with the frequency of the subscription; and authorizing the customer to purchase the product at the subscription price if the customer is redeeming the product in accordance with the frequency.

3. The method of claim 1, in which the product is a dairy product.

4. The method of claim 1, in which the terms of the subscription indicate that the customer is required to purchase the product weekly.

5. An apparatus, comprising:
a processor; and
a memory in communication with the processor, the memory storing instructions that when executed by the processor result in:
receiving, from a customer, a request to establish a subscription;
receiving, from the customer, information that identifies a product for which the subscription is requested to be established;
identifying at least one physical retailer offering the product;
establishing terms of the subscription for the product, in which the subscription is valid at the at least one physical retailer, and in which the terms include information identifying:
- a subscription price, in which the subscription price is less than a retail price of a unit of the product,
- a frequency of the subscription that indicates a period of time,
- a duration of the subscription, in which the duration of the subscription includes a plurality of the periods of time, and
- in which in order to comply with the frequency of the subscription the customer is required to purchase at least one unit of the product in each respective period of time;

receiving, from the customer and via a point of sale, an identifier that identifies the subscription;

receiving, from the customer and via the point of sale, an indication of the product;

determining whether the customer is complying with the frequency of the subscription; and authorizing the customer to purchase the product at the subscription price if the customer is redeeming the product in accordance with the frequency.

* * * * *